July 21, 1970 D. L. BAHRS ET AL 3,521,240

SYNCHRONIZED STORAGE CONTROL APPARATUS FOR A MULTIPROGRAMMED DATA PROCESSING SYSTEM

Filed March 6, 1968 9 Sheets-Sheet 1

INVENTORS
JOHN F. COULEUR
DAVID L. BAHRS
RICHARD L. RUTH

Kenway, Jenney & Hildreth

MAIN MEMORY TIMING SIGNAL WAVEFORMS

July 21, 1970 D. L. BAHRS ET AL 3,521,240

SYNCHRONIZED STORAGE CONTROL APPARATUS FOR A MULTIPROGRAMMED DATA PROCESSING SYSTEM

Filed March 6, 1968 9 Sheets-Sheet 8

EXTENDED MEMORY WAVEFORMS AND TIMING DIAGRAM

PERIPHERAL CONTROL WORD PROGRAM START

F REGISTER CONTENTS=00000

| Q COUNTER STATE | J COUNTER STATE | CONTROL SIGNALS | ACTION |
|---|---|---|---|
| Q00 | J00 | QCNI·N18 | TRANSFER SIGNALS ON N BUS LINES 0-17 TO R REGISTER |
| Q00 | J05 | | PRESET J COUNTER = J05<br>GENERATE AND APPLY QINT SIGNAL TO MEMORY CONTROLLER<br>ADVANCE TO DATA CONTROL WORD RETRIEVAL CYCLE OF OPERATION |

RETRIEVE DATA CONTROL WORD CYCLE

| Q COUNTER STATE | J COUNTER STATE | CONTROL SIGNALS | ACTION |
|---|---|---|---|
| Q00 | J05 | J05 | TRANSFER RRS,DP(10001)SIGNALS TO COMMAND LINES<br>TRANSFER ADDER OUTPUT SIGNALS TO ADDRESS LINES 0-17<br>PRESET Q COUNTER TO Q00 STATE |
| Q00 | J05 | $\overline{LAS}$·QDA | TRANSFER SIGNALS ON N BUS LINES 0-17 TO S REGISTER 0-17<br>TRANSFER SIGNALS ON N BUS LINES 18-35 TO A REGISTER 0-17<br>TRANSFER R REGISTER CONTENTS 0-17 TO T REGISTER 0-17<br>SET LAS FLIP-FLOP TO BINARY 1 STATE |
| Q00 | J05 | LAS·QDA | TRANSFER SIGNALS ON N BUS LINES 0-17 TO R REGISTER 0-17<br>TRANSFER SIGNALS ON N BUS LINES 18-22 TO F REGISTER 0-4<br>RESET LAS FLIP-FLOP TO BINARY 0 STATE<br>GENERATE AND APPLY QINT SIGNAL TO MEMORY CONTROLLER |
| * Q00 | J03 | | PRESET J COUNTER = J03 |
| Q00 | J03 | | TRANSFER CWR,SP(10100) SIGNALS TO COMMAND LINES<br>TRANSFER BASE ADDRESS SIGNALS TO ADDRESS LINES 0-17<br>APPLY A BINARY 1 SIGNAL TO ADDRESS LINE 18<br>TRANSFER T REGISTER OUTPUT SIGNALS TO U BUS LINES 0-17 |
| Q00 | J03 | QDA | GO TO READ, WRITE OR IDLE DATA CONTROL WORD CONTROL CYCLE |

*F REGISTER CONTENTS NOW EQUAL TO ONE OF THE FOLLOWING BINARY DIGIT COMBINATIONS:

11000 (READ)
11010 (WRITE)
01010 (IDLE)

FIG. 10

United States Patent Office 3,521,240
Patented July 21, 1970

3,521,240

SYNCHRONIZED STORAGE CONTROL APPARATUS FOR A MULTIPROGRAMMED DATA PROCESSING SYSTEM

David L. Bahrs, Liverpool, N.Y., John F. Couleur, Dallas, Tex., and Richard L. Ruth, Scottsdale, Ariz., assignors to Massachusetts Institute of Technology, Cambridge, Mass., a corporation of Massachusetts, and General Electric Company, Schenectady, N.Y., a corporation of New York Filed Mar. 6, 1968, Ser. No. 710,996
Int. Cl. G06f *9/18*
U.S. Cl. 340—172.5 30 Claims

ABSTRACT OF THE DISCLOSURE

A multiprogrammed data processing system wherein control apparatus controls the transfer of information between a working store and a sequential access circulating auxiliary store and wherein the control apparatus further retrieves control information from the working store in synchronism with the time of access to information stored in the auxiliary store and maintains the control information in an order corresponding to the time of access for controlling the transfer of information during successive cycles of circulation thereby implementing the flow of information at the speed required by the system.

BACKGROUND OF THE INVENTION

This invention relates to data processing systems and more particularly to storage control apparatus for controlling the transfer of information between the working and auxiliary stores of a data processing system.

A data processing system including a computer for alternately executing a series of programs which are completely or partially located in a quick-access working store is said to be multiprogrammed. One form of multiprogrammed data processing system comprises at least one computer, at least one small capacity quick-access working store, a relatively large capacity circulating auxiliary store and a plurality of peripheral control units each coupled to at least one peripheral device. In such a multiprogrammed data processing system, the series of programs are executed by the computer as controlled by an operating system which is a collection of programs that are executive or supervisory in nature and provide overall coordination and control of the total data processing system. The series of programs also include subject programs which are application oriented programs to perform various data processing jobs providing results required by users. In multiprogrammed data processing systems required to execute a large number of programs, the quick-access working store capacity is too costly to be large enough to contain all of the operating system programs, subject programs, data to be processed and data which is the result of processing. Consequently, only the programs and data most frequently used or currently in process are normally located in working store and the remaining programs and data are located in a relatively large capacity slow-access circulating auxiliary store. As programs and data stored in auxiliary store are required to be executed or processed by the computer, the information must be accessed and transferred to the working store at a speed compatible with the data processing capabilities of the computer.

It is necessary to maintain a continuous supply of programs or parts of programs and data for the working store if the operating system is to be able to have a plurality of different subject programs in process simultaneously. For operating systems to use the equipment complement of the entire data processing system most efficiently, operating systems must call for the right mix of programs for movement to working store. The operating system must also call for movement of processed data to auxiliary store. The operating system schedules the running of all programs by maintaining in an order list, the order in which programs are to be run and providing for a calling sequence for initiating transfer of information between working and auxiliary stores when needed. Frequently, the calling sequence initiates a series of transfers encountering lengthy waiting times in transferring information due to waiting for sequential access to information in the circulating auxiliary store.

Generally, control of information movement between working and auxiliary stores in the system described comprises expeditiously accessing data to be processed, data which is the result of processing, and the programs or parts of programs providing the required data processing functions between the working and auxiliary stores and controlling each of the working and auxiliary stores to provide efficient storage and retrieval of information being transferred. Such control is effected by one of the peripheral control units. Auxiliary stores normally function as one of a plurality of peripheral devices being controlled by a peripheral control unit.

All data processing operations are performed on operand words under control of instruction or control words of programs. An operand word represents a unit of information to be processed or information which is the result of processing. An instruction word, hereinafter referred to as an instruction, designates a particular operation for the computer to perform. A control word designates a particular type of peripheral device operation or data transfer function for a peripheral control unit to control. Each control word comprises portions called "address fields" which represent specific locations in working and auxiliary stores that contain instruction, control or operand words.

The locations in a circulating auxiliary store are normally circumferentially disposed storage areas termed sectors on a surface of a circulating member. The sectors are successively located by circumferential position about an axis of circulation and are thus sequentially accessible in their order of location relative to a starting sector accessed at the start of each cycle of circulation.

The peripheral control unit gains access to working store locations by means of control words which are stored in working store and transferred to the control unit in response to a computer executing a particular instruction of an operating system calling sequence. Once the control unit receives a control word it performs autonomously to retrieve and execute a string of additional control words to provide for data access and transfer operations. The operating system has previously stored the string of control words in the working store in the order of execution. The computer is now free to continue with its high speed execution of subject programs.

Prior art peripheral control units provide for transfer of information between a working and circulating auxliary store by controlling the execution of a string of control words termed "data control words." At the completion of the execution of each string of control words, the circulating store is disconnected from the control unit and the control unit disconnected from the system. Only the computer can initiate another transfer of information by executing an instruction which results in transferring a first control word of a string to the control unit. The control unit responds to the first control word to connect the circulating store to the control unit and to signal the details of control information for controlling a specified storage operation at a specified sector of the circulating store member. The time of connection is independent of the accessible sector at the time the transfer is initiated and is also independent of the time at which the specified sector storing the information to be transferred is accessible. Thus, an average waiting time equal to one-half of the time required for a cycle of circulation of the circulating store is introduced between the instant the control unit signals the details of a transfer of information and the instant the transfer commences. Each such disconnection and reconnection requires excessive operating system time and waiting time for initiating each new transfer of information.

Therefore it is an object of this invention to provide storage control apparatus for more rapidly controlling the transfer of information between the stores of a multiprogrammed data processing system.

Another object of this invention is to provide storage control apparatus for more rapidly controlling the transfer of information between a working store and a circulating auxiliary store of a multiprogrammed data processing system.

It is another object of this invention to provide storage control apparatus for enabling most efficient use of a data storage system by effecting timely information transfer between a working store and a circulating auxiliary store.

The form of prior art peripheral control unit previously described retrieves a string of control words which are stored by an operating system in the order in which requests for transfer of information are received without regard to the order of accessibility to the sector storing the information to be transferred. Thus, an average waiting time of one-half of the time required for a cycle of circulation is encountered as previously described.

It is therefore another object of this invention to provide control apparatus for enabling timely storage of control information for more efficient control of working and auxiliary stores.

SUMMARY OF THE INVENTION

The foregoing objects are achieved according to one embodiment of the instant invention, by providing in a multiprogrammed data processing system, storage control apparatus for maintaining a supply of data control words in a working store, for supplying successively a control word in synchronism with the time of accessibility of each sector of a circulative auxiliary store and for responding to information supplied in a control word for controlling the execution of a control word to direct the transfer of information between specific cells in a working store and a sector of a circulating auxiliary store or to provide an ineffective operation as each sector is accessible.

The system of the instant invention includes at least one computer, at least one peripheral control unit, a large capacity circulating auxiliary store, and at least one working store. Each computer is an automatic data processing equipment unit which after it has been given an initial instruction is capable of operating on a series of instructions to generate a desired result.

Each peripheral control unit is essentially an automatic data processing equipment unit, which after it has been given an initial data control word is capable of retrieving and executing data control words in succession to provide for control of a specific data input-output operation. The peripheral control unit is capable of requesting a data control word from working store and after controlling its execution, requesting the next data control word from working store. A peripheral control unit of the system is coupled to the working store and the auxiliary store to provide for controllable transmission of information between the working store and the auxiliary store.

Each data control word includes address fields providing a representation of the following locations: (1) the working store cell being adapted to store the information to be transferred, (2) the auxiliary store sector being adapted to store the information to be transferred and (3) the working store cell storing the next data control word to be retrieved by the peripheral control unit. Each data control word includes a function portion in addition to the address fields. The function portion specifies such transfer functions as the direction of transfer and other transfer functions, an ineffective non-transfer storge function, and other non-transfer functions. Associated with each direction of transfer function and ineffective non-transfer storage function is a corresponding storage operation, such as for example, the retrieval and storage operations of the working and auxiliary stores. The peripheral control unit responds to the function portion of each data control word to generate the required communication to each store for controlling the auxiliary and working store operations during the transfer of data between working and auxiliary stores.

The peripheral control unit gains access to each sector represented by the address field of each control word, in the sequential order of circumferential position of the sector, for a specific interval of time during each cycle of circulation of the auxiliary store. During the time of accessibility of each sector, the control unit controls the execution of a control word and at an ending portion of each sector, retrieves a next control word from the working store. The control unit responds to the next control word to provide the required communication for controlling the next transfer or non-transfer function before the beginning of access to the next sector. By storing a string of control words, having a control word corresponding to each sector accessible in a cycle of circulation in a set of cells of the working store, the control unit retrieves and controls the execution of a control word representing a storage operation to be executed by the auxiliary store as each sector is accessible.

The string of data control words stored in the working store is continuously maintained by the operating system. The operating system receives requests for information transfers from different programs of the operating system and prepares a calling sequence for transferring information between the working store and auxiliary store, determines what sectors and cells are involved in the transfer, generates the data control words and stores the data control words in the set of cells in the working store. The data control word specifies a circulating store sector by circumferential position. Instead of the order of the control words in the string corresponding to the order in which the requests are received by the operating system the order is determined by the circumferential position of the sectors. Thus, when the circulating member reaches a new circumferential position corresponding to the beginning of the next sector, the next data control word controls a storage operation to be performed at that sector.

The peripheral control unit continues to retrieve control words from the string of data control words during periods of time before requests have been received for transferring information between the working store and a sector in every circumferential position. In this situation, the operating system uses the control word specifying an ineffective storage operation. This allows the control unit to control an ineffective storage operation as each sector not participating in a transfer operation is accessible. By maintaining in a string a control word corresponding to each circumferential position, the control unit maintains synchronism with the circulating store for retrieving a control word as each sector is accessible. The peripheral control unit continues to retrieve and control the execution of the string of control words cyclically during successive cycles of circulation. Thus under normal operation, the control unit never disconnects from the auxiliary store and does not have to be repeatedly connected to the auxiliary store during times of no information transfer thereby eliminating the waiting time for access due to disconnection and connection.

The peripheral control unit responds to the data control word address field specifying the working store cell containing the control word corresponding to the next accessible sector for storing a pointer in a working store cell as the control unit begins controlling the execution of each next data control word. The pointer represents the cell in the working store containing the control word corresponding to the currently accessible sector. The operating system retrieves the pointer from the working store to determine the cell of the string containing the control word which is presently being utilized by the control unit. This provides the operating system with an indication of which one of the circumferential sectors is currently accessible, such that the operating system may store new data control words in the order of access to each sector.

Other embodiments of the instant invention provide for the operating system to store control words corresponding to successive accesses to the same sector. For example, through the use of a plurality of strings of control words, each string corresponding to a cycle of circulation, or through the use of a string which contains a number of control words corresponding to the number of sectors accessed during a plurality of cycles, control words corresponding to sectors of successive cycles of circulation are stored in a string in the order of successive accesses to each sector.

Accordingly, the peripheral control unit of the instant invention successively retrieves a data control word from working store in synchronism with the circulating auxiliary store as each sector is accessible. The control unit then responds to data control word information to control a storage operation as each sector of the circulating store is accessible thereby implementing information transfer and ineffective storage operations as each sector is accessible to provide for the transfer of program information between working and auxiliary stores at the high data transfer rate required by a multiprogrammed data processing system. The peripheral control unit also responds to each control word to provide for storing new control words in the working store in a string of cells in the order of access to corresponding sectors thereby reducing the waiting time for transferring information between working and auxiliary stores.

BRIEF DESCRIPTION OF THE DRAWINGS

This invention will be described with reference to the accompanying drawings wherein:

FIG. 10 is a timing diagram useful in explaining the operation of the system during retrieval of data control words.

DESCRIPTION OF THE PREFERRED EMBODIMENT

Figure 1:
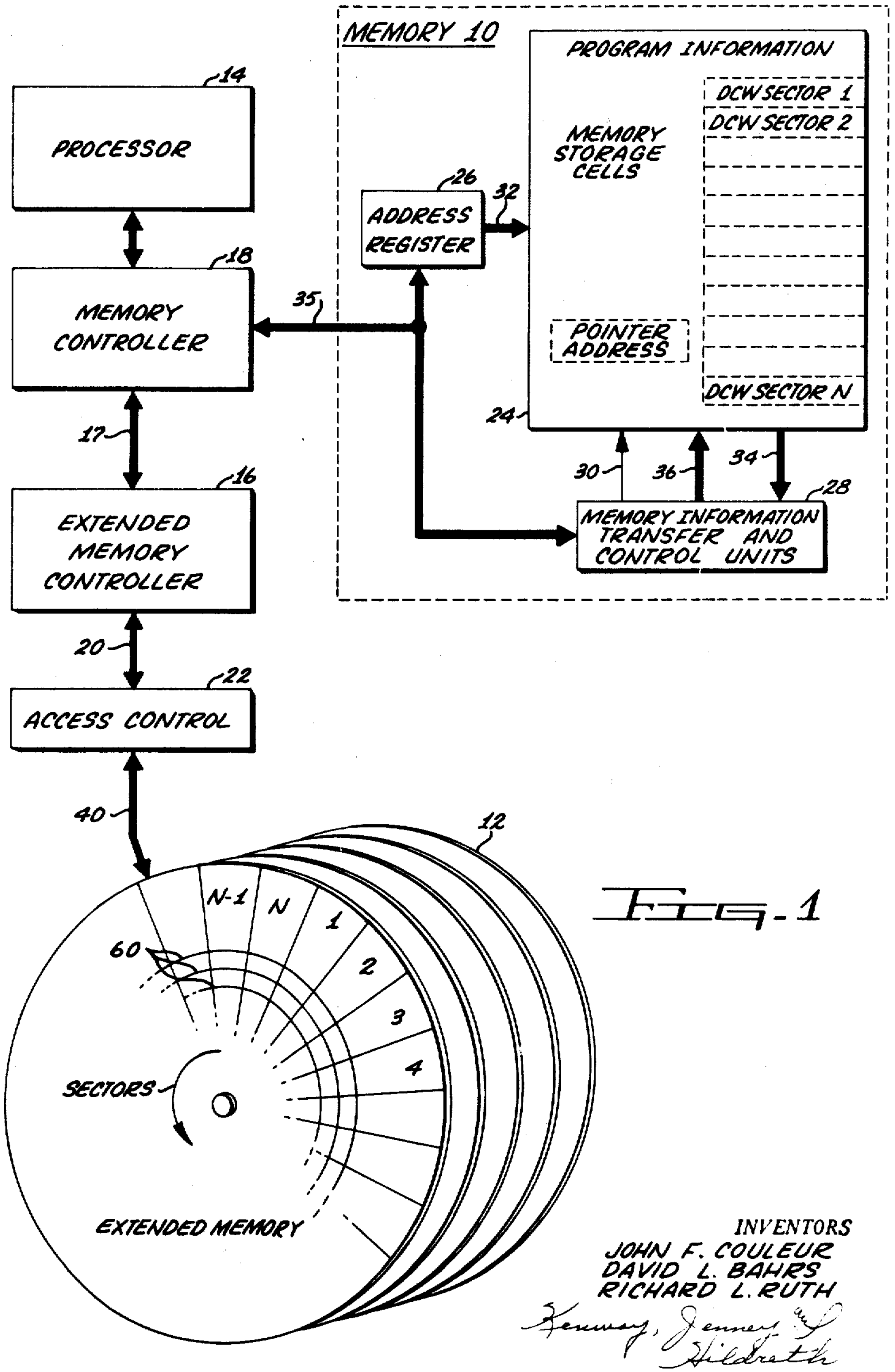
FIG. 1 is a block diagram of a multiprogrammed data processing system embodying the instant invention.

The data processing system of FIG. 1 is adapted to transfer large amounts of information very rapidly between a working store and an auxiliary store under control of control information stored in the working store. Lines interconnecting the various components illustrated in FIG. 1 symbolically represent cables providing a plurality of conductors providing paths of data and control communication.

A working store, to be referred to hereinafter as a main memory, may comprise by way of example, memory 10. The main memory provides for storage of information which is available for immediate processing by the data processing system. An auxiliary store which may be, for example, extended memory 12 is provided as an extension of the main memory. Extended memory 12 provides storage for overflow information which cannot be contained within main memory. Memory 10 is a quick-access low capacity memory, which may be for example, a conventional random access magnetic core store. Extended memory 12 may be for example, a relatively slow-access high capacity conventional circulating magnetic disc or drum store.

A computer, which may be for example processor 14, is provided for performing the actual processing of information. A peripheral control unit, which may be for example extended memory controller 16, is provided for controlling the transfer of information between main memory 10 and extended memory 12.

All information to be processed is either retrieved or stored in information units, known as data words in memory 10 by processor 14. Data words may also be retrieved from or stored in memory 10 by extended memory controller 16.

Data words are units of information utilized by the system and comprise instruction and control words of programs and operand words representing information to be processed or information which is the result of processing. The processor and controller respond to a series of instructions or control words, known as a program, to perform a particular data processing or transfer operation on operand words. The data word employed in the illustrated embodiment is composed of 36 binary digits.

Processor 14, controller 16 and memory 10 are connected to memory controller 18. Memory controller 18 receives and schedules all communications between memory 10 and processor 14 or extended memory controller 16. The memory controller also makes it possible for processor 14 or extended memory controller 16 to control memory 10.

Access control 22 is connected to extended memory controller 16 and extended memory 12 to respond to control signals received from controller 16 to perform a particular storage operation on data words at a specified location of memory 12. Access control 22 makes it possible for controller 16 to control memory 12.

Extended memory controller 16 functions as an automatic information transfer apparatus providing communication between memory controller 18 and access control 22 for transferring information between memory 10 and extended memory 12 at a high data transfer rate. Extended memory controller 16 also functions as a controller for memory controller 18 and access control 22 to control the storage functions of retrieval and storage of information in memory 10 and extended memory 12 respectively. Each of memories 10 and 12 is an addressable memory, wherein a storage location is explicitly and uniquely specified by means of an address. Only a single data word may be stored in an addressable location of memory 10 whereas a predetermined number of data words may be stored in an addressable location of memory 12. A data word is retrieved from or inserted into a storage location of the addressable memory only after such memory is supplied with the address of the location.

Extended memory controller 16 operates autonomously to control the execution of a string of data control words, following initiation of operation, while the remainder of the system is available for other operations. The strings of data control words are parts of programs performed under the control of the operating system. For example, operation of extended memory controller 16 is initiated by the operating system and proceeds to automatically control memories 10 and 12 to provide different storage operations and transfer functions to transfer data between a number of consecutive locations in memory 10 and a location in extended memory 12. Processor 14 and extended memory controller 16 each may continue independently executing different programs or controlling the execution of parts of programs during multiprogrammed data processing system operation.

Figure 5:
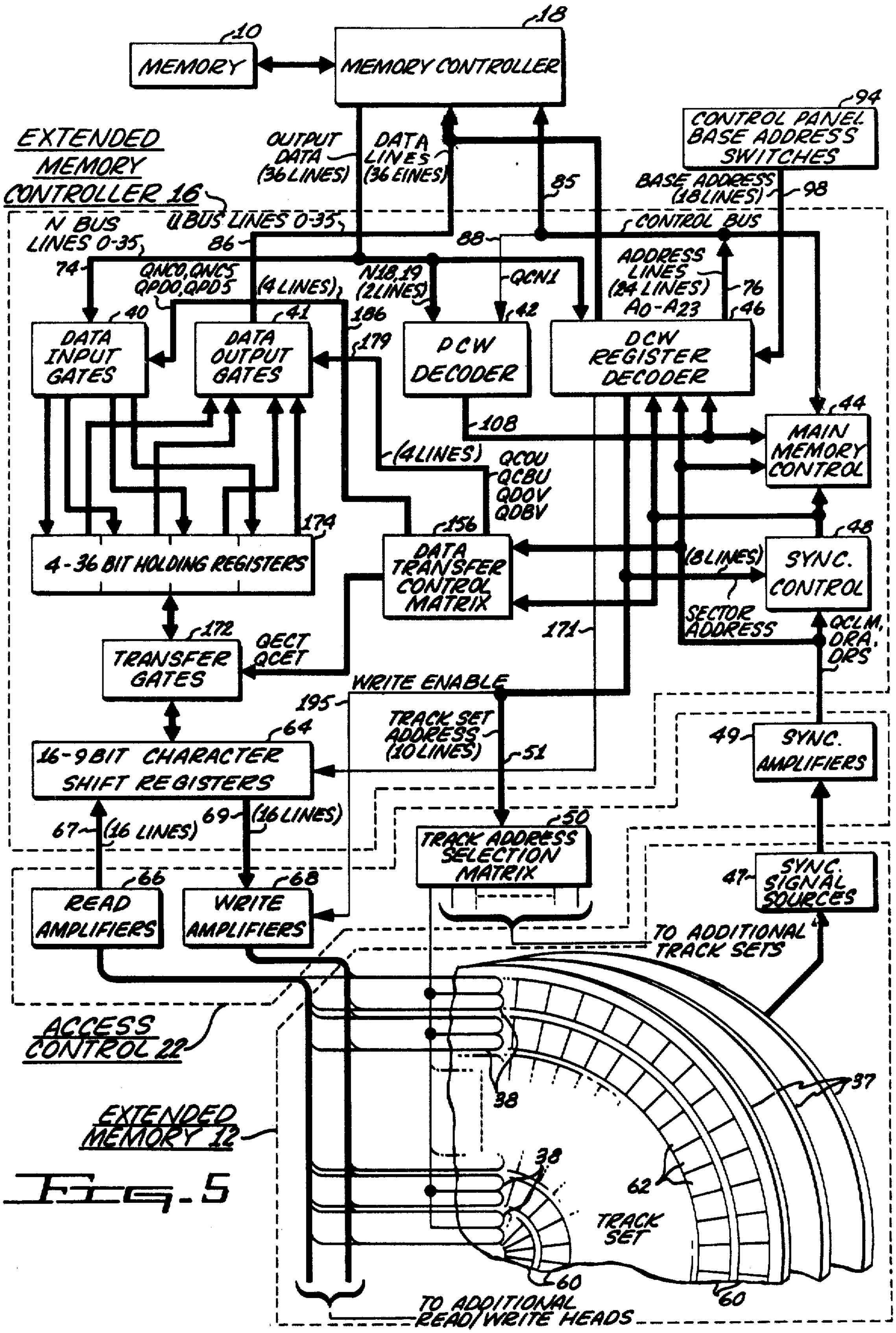
FIG. 5 is a block diagram illustrating in detail the instant invention.

In the multiprogrammed data processing system illustrated in FIG. 1, extended memory 12 comprises a circulatable storage member having a peripheral surface which may be way of example, have magnetic storage characteristics with a plurality of circumferentially disposed sectors for storing information. The circumferentially disposed sectors are illustrated as being equi-angular sectors designated 1 through N around an axis of circulation. The surface may comprise discrete circumferential storage tracks 60. The storage tracks as thus provided extend continuously around the extended memory periphery and are used in the N equi-angular sectors. The disposed sectors may also be unequal angular sectors provided that the sum of the angles of the sectors accessible each cycle of circulation is less than or equal to 360°. Conventional magnetic read and write heads 38, FIG. 5, are disposed adjacent the tracks and each sector is accessible as the sector circulates into a predetermined angular relationship to the read and write heads. Associated with the circulatable storage member and providing a series of synchronism signals in synchronism with the circulation of extended memory 12 is a timing signal source. The timing signal source provides signals, by means of lines in cable 40 to access control 22 and through lines of cable 20 to extended memory controller 16, representing the start and end portions of each sector.

Memory 10 comprises storage elements 24, an address register 26, and a memory data transfer and control unit 28. Memory storage cells 24 are adapted to store a plurality of data words or instructions in a corresponding plurality of memory storage cells, each such cell storing one data word, one instruction or one control word. Each memory storage cell is designated by an address. An address register 26 stores the address of one of these memory cells. Memory transfer and control unit 28 retrieves the contents of or stores a data word, instruction or control word in the cell addressed by register 26. To provide its functions, a control unit 28 delivers signals on control lines 30 to control the retrieval or storage functions with respect to the particular memory location designated by address signals 26. The address stored in register 26 is communicated to memory storage elements 24 over control lines 32. Data lines 34 illustrate the path provided for data word, insrtuction and control word storage into memory elements 24. Data lines 36 illustrate the path provided for data word, instruction and control word storage into memory elements 24. Data lines 36 illustrate the path provided for data word, instruction and control word retrieved from memory storage elements 24.

In normal operation of the system, a set of the memory cells are reserved for the storage of data control words which control the sequence of transfer operations to be performed by the system. The set of memory cells are illustrated, by way of example, as being contiguously located cells. Additionally, FIG. 1 illustrates that a memory cell is reserved for the storage of the address of the cell containing the next data control word and the remaining cells are for temporary storage of program information.

The data control word comprises two 36 bit words having four portions, as previously described and will hereinafter be referred to as a "DCW." The DCW's are stored in memory 10 by the operating system programs.

The present invention is directed to improving the operation of the multiprogrammed data processing system in controlling extended memory 12. Accordingly, the description of the mode of operation of the invention will be primarily directed to operation of the system in controlling the transfer of information between memory 10 and extended memory 12.

There will now be provided a summary description of operation when the operating system specifies that communication is to be made between memory 10 and extended memory 12. One instance when such communication is required is when all or a portion of a subject program, which is not in memory 10 must be executed. Extended memory 12 contains the subject programs which are not currently in use but are required for early execution. These programs are requested by the operating system. The data words comprising the subject program in extended memory 12 must be moved into available space in memory 10 before it may be accessed by a processor or controller for execution. Processor 14, upon executing a particular type of instruction, termed a "connect" instruction of the operating system programs, requests information not currently in memory 10. When the processor executes a connect instruction, a signal is generated and applied to memory controller 18 to initiate a storage retrieval operation for retrieving a particular type of control word termed a peripheral control word, hereinafter referred to as a "PCW" from memory 10 and delivering the PCW to extended memory controller 16.

The control words are stored in memory 10 by the operating system programs. The operating system programs also provide the connect instruction to processor 14 which executes the instruction by providing control signals to memory controller 18. Memory controller 18 responds to the control signals to provide for retrieval of the PCW from memory 10 and to deliver the PCW to extended memory controller 16. If the PCW delivered to extended memory controller 16, upon execution of the aforementioned connect instruction, contains a "start" retrieve data control word operation portion, controller 16 must start an operation to control information transfer functions between extended memory 12 and memory 10, the information transfer function to be provided is determined by retrieving the contents of two successive locations in memory 10, utilizing the address supplied by the PCW. The data words in these two locations are the first one of a string of DCW's.

Extended memory controller 16 controls memory controller 18 to retrieve a first DCW as a result of providing a request for access to memory 10. The request for access is provided by applying an access request signal to memory controller 18. Assuming that controller 16 is given access to memory 10 by memory controller 18, controller 16 then sends address and control signals specifying a read type of operation by memory 10 through memory controller 18. Memory 10 responds to the control signals to perform a read operation for reading a DCW out of the two memory locations specified by the address signals and transfers the pair to memory controller 18. Memory controller 18 then transmits the DCW, one word at a time to extended memory controller 16, where the DCW is stored. Controller 16 responds to the DCW to provide for the subsequent type of information transfer or ineffective function and control of a particular type of storage operation of main and extended memories as specified by a portion of the retrieved DCW.

Each DCW contains a function portion which determines the type of transfer or ineffective function to be controlled by controller 16. Controller 16 responds to the function portion of the DCW's to control the type of information transfer such as the direction of information transfer between memory 10 and extended memory 12. Controller 16 also responds to the function portion to transmit control signals to memory 10 and access control 22 to control the type of storage operation of each memory, such as retrieval or storage which are to be referred to hereinafter as read or write operations respectively. Successive DCW's may therefore specify a change in type of operation to be performed. The function portion may also represent an ineffective operation to be referred to hereinafter as an idle operation requiring a storage operation to be provided at a specified sector under control of controller 16. Controller 16, at the completion of each retrieval of a DCW automatically stores the address of the DCW corresponding to a currently accessible sector means of communication through memory controller 18. The address of the DCW corresponding to the currently accessible sector serves as a pointer for use by the operating system programs to determine the order in which to store DCW's in memory 10.

When extended memory 12 circulates to an ending portion of each sector, a synchronizing signal representing the ending portion of the currently accessible sector is transmitted to extended memory controller 16. Extended memory controller 16 responds to the synchronizing signal to apply the address of the next DCW from a portion of the current DCW and control signals to memory controller 18. Controller 18 controls memory information and control units 28 to retrieve the next DCW from memory storage elements 24 on data line 34 and transfers the DCW on cable 38 to memory controller 18. The DCW is then transferred by controller 18 to controller 16. During control of the execution of a DCW specifying an information transfer, a main memory data address portion of the DCW is transferred to address register 26 over cable 38, whereby during execution of the DCW this address portion will designate the memory cell from which a data word is to be retrieved or in which a data word is to be stored. The digits of the function portion of the DCW are decoded by extended memory controller 16 and a signal is delivered on a control line of cable 20 to access control 22. An extended memory address designating a sector is also applied over lines of cable 20 to access control 22. Whenever the control line delivers a signal, a corresponding storage operation is executed by access control 22 to perform selectively the storage operations of entering information into and retrieving information from a designated sector as access is provided to the designated sector.

In one embodiment a set of memory storage cells 24, as represented in the memory map of memory 10 in FIG. 1, stores a string of N DCW's, each DCW corresponding to a respective one of sectors 1 through N of extended memory 12. Access control 22 is capable of executing N individual and distinct storage operations in each cycle of circulation of the drum since each of the N sectors can contain all of the information to be operated on in response to each of the N DCW's. Each cell of the set stores a DCW since a DCW having a function code specifying an ineffective operation may be stored in each pair of cells containing a DCW corresponding to a sector not participating in a transfer of information. Each cell of the set of cells in memory 10 therefore stores a DCW corresponding to each sector of extended memory 12 which is accessible during a cycle of circulation. Each DCW may specify one of a plurality of different types of transfer operations or an ineffective operation. Extended memory 16 responds to the synchronizing signal from extended memory 12 to successively retrieve a DCW as each sector is accessible and provides a storage operation associated with each transfer or ineffective operation as each sector is accessible. In this manner, extended memory 12 remains connected to extended memory controller 16 to perform a storage operation as each sector is accessible.

The DCW corresponding to sector N may include an address of the next DCW representing the cell containing the DCW corresponding to a starting sector of a next cycle of circulation, thus the string of DCW's may be retrieved cyclically for execution. DCW's stored in each of the set of cells are therefore retrieved each cycle of circulation thus providing for control of extended memory 12 during successive cycles of circulation. During each cycle of circulation, the operating system receives transfer requests from other system programs and provides for replacing each DCW which has been executed with a DCW specifying an ineffective operation and inserting new DCW's specifying transfer operations according to the order of accessibility to sectors. The operating system receives the pointer address of the next DCW from the cell provided as illustrated in FIG. 1 to determine the cell containing the DCW currently being executed and the currently accessible sector of the drum. In response to the pointer address the operating system stores a DCW specifying an ineffective operation in the cell containing the DCW corresponding to the currently accessible sector following execution of the DCW corresponding to the currently accessible sector. The operating system also responds to the pointer address to store a DCW specifying a transfer operation at any cell of the set containing a DCW corresponding to a sector other than the currently accessible sector provided that the cell contains a DCW specifying an ineffective operation. The operating system retrieves the DCW from any cell and tests to determine if the stored DCW specifies an ineffective operation before storing a new DCW specifying a transfer operation and inhibits storing the new DCW if the stored DCW does not supply ineffective operation.

Figure 2:
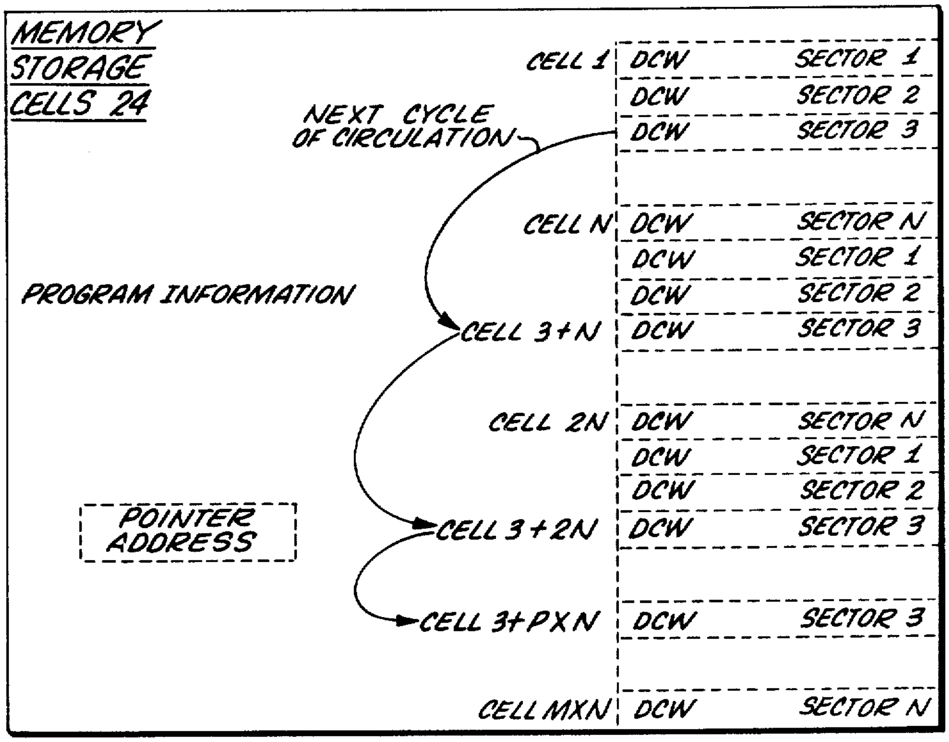
FIG. 2 is a storage map illustrating a string of data control words.

A second embodiment is illustrated by the memory map of FIG. 2 in which a string of M times N DCW's are stored in a set of memory storage cells 24. The integer M represents a number of cycles of circulation such that the string of DCW's is M cycles of circulation long. A DCW is executed as each sector is accessible as previously described with the added capability of storing M DCW's for each sector 1 through N. When a plurality of requests for transfer are received involving a transfer of information from the same sector, the operating system stores a respective DCW corresponding to each transfer request at a cell corresponding to the same sector of a successive cycle of circulation. For example, as illustrated in FIG. 2, a DCW may be stored at any cell located P times N relative to a cell containing a DCW corresponding to a sector accessible during the current cycle of circulation.

The operating system utilizes the pointer address as previously described to determine the cell containing the DCW corresponding to the currently accessible sector. Following the operation to determine the cell, the operating system stores a DCW specifying an ineffective operation at the cell containing the DCW corresponding to the currently accessible sector following execution of the DCW corresponding to the currently accessible sector. The operating system retrieves a DCW from any cell and tests to determine if an ineffective operation is specified before storing a DCW specifying a transfer operation. For example, if a DCW specifying a transfer operation is to be stored in a cell corresponding to sector 3, cells 3+N, 3+2N, 3+P times N are tested and the DCW stored at the first cell tested which contains a DCW specifying an ineffective operation. Thus, a string of DCW's which is M cycles long provides for storing a multiple number of DCW's requiring access to the same sector. The address of the next DCW in the DCW corresponding to sector M times N may be the address of the cell storing the DCW corresponding to a sector representing a starting sector of a starting cycle of circulation to provide for cyclically retrieving the string of M times N DCW's.

Figure 3:
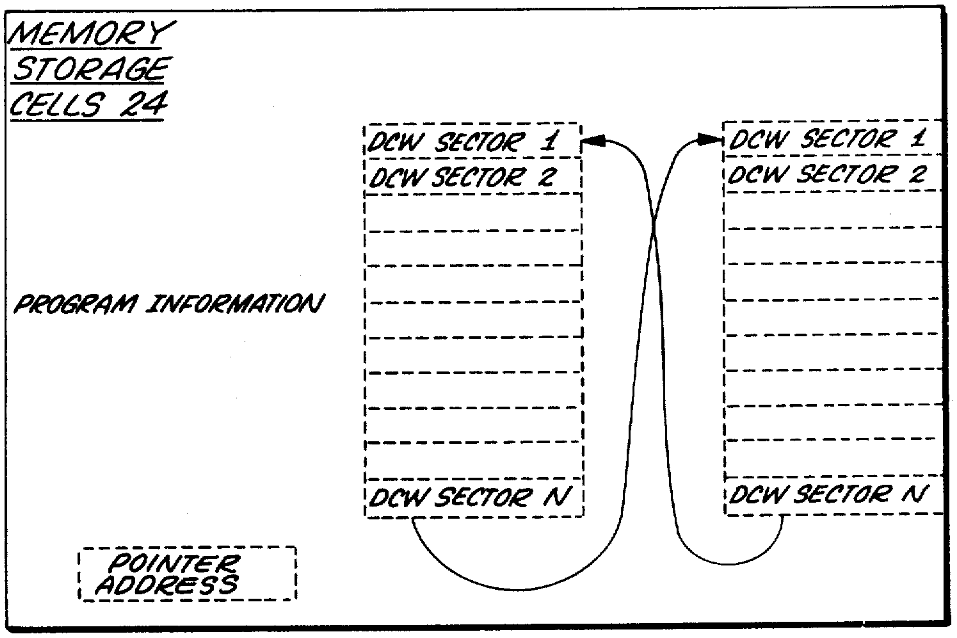
FIG. 3 is a storage map illustrating a plurality of strings of data control words.

A third embodiment is illustrated by the memory map of FIG. 3 in which two sets of cells, each set of cells storing a DCW corresponding to each of sectors 1 through N of extended memory 12. The address of the next DCW included in the DCW corresponding to sector N of each set is the address of the cell storing the DCW corresponding to sector 1 of the other set such that following execution of the DCW corresponding to sector N of one set, during a specific cycle of circulation, the extended memory controller will start retrieving DCW's from the other set during the next cycle of circulation. In this manner the extended memory controller alternates to retrieve and execute DCW's from a different one of the two sets for each successive cycle of circulation. The operating system retrieves the pointer address and responds as previously described to store DCW's specifying an ineffective operation in the cell of the set containing the DCW corresponding to the accessible sector following the execution of the DCW corresponding to the currently accessible sector. During successive cycles, the operating system is storing DCW's specifying transfer operations in any of the cells of the set not supplying DCW's for the current cycle of circulation. The operating system retrieves the DCW from any cell and tests to determine if an ineffective operation is specified before storing a DCW specifying a transfer operation and inhibits storing if an ineffective operation is not specified.

The multiprogram system of FIG. 1 processes information represented by the binary code. With the binary code, each element of information is represented by a binary digit, sometimes termed a bit, each binary digit being either a 1 or a 0. The unit of information primarily employed in processing is termed a data word and also sometimes termed a computer word. The data word in the system of FIG. 1 processes 36 bits. Four types of data words are employed in this system. Instruction word, operand words and two types of control words.

The operand is a data word on which an arithmetic or logical operation is performed by processors 10 and 14 which is the result of a data processing operation performed by a processor. Thus, the operand represents information which is to be processed and which is received from a memory by a processor, or information which is the result of processing and which is transmitted to a memory by a processor.

The instruction word is employed to direct a discrete step in the data processing operation being executed by a processor. The instruction word is received from a memory by a processor.

The two types of control words are designated control words (PCW's) and data control words (DCW's). As previously described, a peripheral control word (FIG. 4) is composed of 36 binary digits of information. The first 18 bits of the PCW designated as bits 0–17 provide a binary number representing the address of the first location of two successive locations in memory 10 containing the first of a string of DCW's. Two bits designated as bits 18, 19 provide a code specifying the type of operation to be performed by the extended memory controller, and three bits 35–38 are utilized by the memory controller in directing the PCW to the extended memory controller. The PCW also has 13 spare bits. If the PCW bits 18 or 19 are both binary 0's, an emergency disconnect operation is specified and the extended memory controller immediately halts any operation in process. The emergency disconnect operation is effective only when the extended memory controller is transferring information, which is referred to as the busy state. If bit 18 is a binary 0 and bit 19 is a binary 1, the extended memory controller performs a housekeeping operation, an understanding of which is not material to an understanding of the invention. If bit 18 is a binary 1, a "start," retrieve data control word operation for retrieving a DCW from memory 10 is specified.

Figure 4:
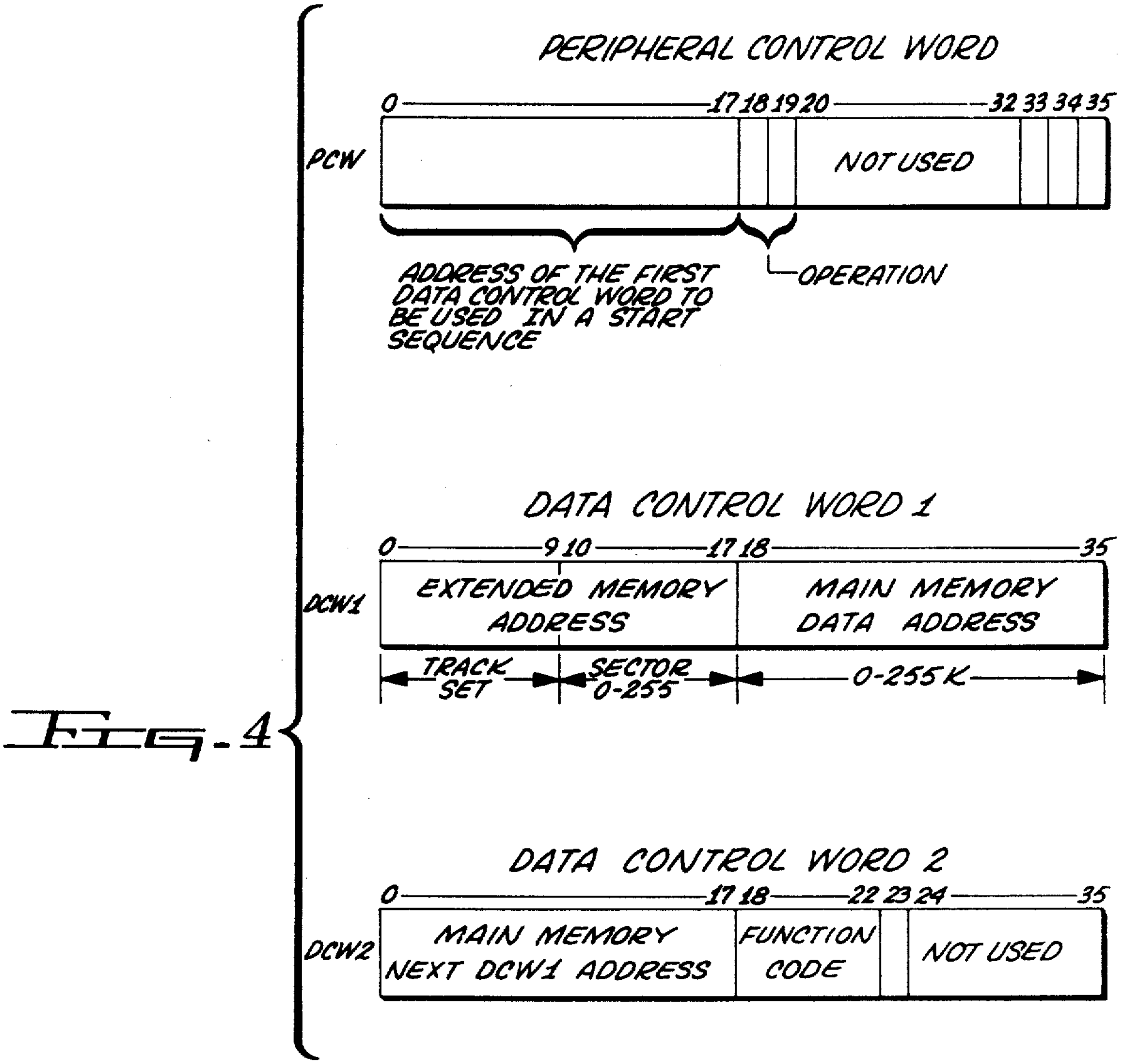
FIG. 4 is a symbolic diagram of the contents of the various conthol words employed in the system of FIG. 1.

A pair of words representing a DCW, FIG. 4 designated as DCW1 and DCW2 hereinafter are each comprised of 36 binary coded bits of information. The first indicated 18 bits of DCW1 designated bits 0–17, provide an address in extended memory 12 and 18 bits designated 18–35 provide the beginning address in memory 10 between the location being adapted to store information which is to be transferred. DCW2 contains 36 bits, 18 bits designated 0–17 provide the address of the cell in memory 10 containing the DCW1 of the next DCW. (The address of the cell containing DCW1 is hereinafter referred to as the pointer address to the next DCW in a string of DCW's.) Five bits designated 18–22 provide a function code to specify the type of operation to be performed by extended memory 12 during an information transfer as shown in the following table.

| Code: | Type of operation |
|---|---|
| 11000 | Read. |
| 11010 | Write. |
| 01010 | Ineffective (to be referred to hereinafter as an "Idle" operation). |

One bit designated as bit 23 provides for control of an operation, an understanding of which is not material to an understanding of this invention. DCW2 also has 12 spare bits.

The data processing system of FIG. 1 is adapted to transfer information between memory 10 and extended memory 12 under operational control of extended memory controller 16. A summary description of the operation of extended memory controller 16, FIG. 5 will now be provided. During its operation the extended memory controller is always in one of two phases, the "retrieve data control word" cycle or the control cycle for controlling the execution of a DCW. In the retrieve data control word cycle, the extended memory controller retrieves a DCW from two successive storage locations in memory 10, transfers the function code portion of the DCW to a DCW register decoder 46 and senses the function to be controlled or determines the type of storage operation to be executed and the next cycle to be entered. Decoder 46 responds to the function code to generate a corresponding function signal. In the control cycle the extended memory controller responds to the function signal to provide for controlling a particular type of transfer function for receiving or transmitting data in a specified direction. The extended memory controller also responds to the function signal to generate storage control signals which are applied to memory controller 18 and access control 22 to control the particular type of storage operations to be provided.

The particular type of operation is determined by one of three function signals which are presented at the output of decoder 46 namely, RDY, WRY or IDLE corresponding to the previously described read, write and idle (ineffective) operations respectively. These signals are provided in accordance with the binary configuration of the states of five flip-flops of a register designated as the F register in decoder 42.

During initialization of operation, extended memory controller 18 receives a PCW from memory 10 as a result of memory controller 18 responding to processor 14 executing a connect instruction. Output data lines identified as N bus 74 provides 36 lines, designated as (0–35), are connected between memory controller 28 and extended memory controller 18 to provide an information transfer path from controller 30 to controller 18. N bus 74 supplies bits 18 and 19 of the peripheral control word to a PCW decoder 42 and the address portion of the PCW (bits 0–17) for storage in a register of DCW register and decoder 46. Decoder 42 also receives a signal designated as QCN1 on a line 88, to be described hereinafter, from memory controller 18 to enable decoding bits 18 and 19 to determine what operation is to be performed by extended memory controller 16.

Assuming that decoded bits 18 and 19 specify that a

"start," retrieve data control word operation is to be performed, PCW decoder 42 provides a control signal resulting from decoding bits 18 and 19 to a main memory control 44. Control 44 then applies a request for access, a command code specifying a main memory retrieval operation and the address of a DCW to memory controller 18 on lines within cable 85 which is designated as the control bus interconnecting controllers 18 and 16. Memory controller 18 responds by retrieving and transmitting a DCW comprised of words DCW1 and DCW2 applied one word at a time to N bus 74 for transfer into decoder 46 in response to control signals from main memory control 44.

DCW decoder 46 decodes the function portion of the DCW to provide control signals for controlling memory 10 and extended memory 12 to effect a specified information transfer between memories. Control signals from decoder 46 are applied to main memory control 44, synchronization control 48, write amplifiers 68, track address selection matrix 50, and data transfer control matrix 156. Main memory control 44 responds to a RDY or WRY function signal to provide a command code and other control signals to be described hereinafter to memory controller 30 on control bus 85 and control signals to decoder 46 to control applying the address of information to be transferred to control bus 85 and subsequently to memory controller 18. The control signals supplied to synchronization control 48 comprise an extended memory sector address which is compared with sector addresses applied from extended memory 36 until comparison is achieved indicating that the addressed location is available for access. The control signals applied to track selection matrix 50 comprise a track set address for activating 16 read/write heads simultaneously.

While address comparison is being performed by synchronization control 48, main memory control 44 has provided signals which in the case of a write operation have provided for the retrieval and the trassfer of four 36 bit words from 4 consecutive locations of one of memories 22 or 23 into four 36 bit holding registers 174. Since N bus 74 provides only 36 lines for transfer of one 36 bit word at a time, 4 sets of 36 gates within data input gates 40 are enabled selectively by 4 signals from data transfer control matrix 156 to enter 36 bits successively into a first, second, third and fourth 36 bit holding register. In the case of a read operation, no main memory information transfer is performed until after address comparison. For a write operation, upon achieving sector address comparion by extended memory control 48, the four 36 bit word holding register 174 contents are transferred in parallel through transfer gates 172, in response to a control signal applied to transfer gates 172 from data transfer control matrix 156 into sixteen 9 bit character shift registers 64.

For a read, write or idle operation, following address comparison, main memory control 44 provides shift signals to each of the sixteen 9 bit character shift registers, beginnig at the proper time, to permit shifting information bits serially from each shift register to write amplifiers 68 or from read amplifiers 66 into each shift register at the bit time reading or writing rate of extended memory 12. After nine shift signals, 16 9-bit character shift registers 64 are either filled with 16 characters which have been read or are empty and need refilling with 16 new characters to write during the next nine shift signals.

During a read operation, main memory control 44 provides for parallel transfer of sixteen 9 bit character shift registers 64 to four 36 bit holding registers 174 and subsequent applications to memory controller 30 along with command, address and timing signals to provide for a storage operation of four words in one of memories 22 or 23 following every nine shift signals. During every nine shift signals provided while performing a write operation, four new 36 bit words are retrieved from memory 22 or 23, transferred in parallel into four 36 bit word holding registers 174 and then into sixteen 9 bit character shift registers 64 before applying the first of the next eight shift signals during a write operation. Main memory control 44 provides for automatically incrementing the address applied to memory controller 30 such that words are stored in or retrieved from a block of 64 main memory locations whose addresses are consecutive.

During an idle operation, data is shifted into each shift register as previously described for the read operation however, no parallel transfer to the holding registers or control of memory controller 18 is provided.

The control of a read, write or idle operation continues until an end sector signal is received by main memory from extended memory 12. When the end sector signal is received, main memory control 44 discontinues the supply of shift signals to the sixteen 9 bit character shift registers and provides control signals for initiating a retrieval of the next DCW pair from the main memory utilizing the main memory address of the next DCW supplied by the DCW portion designated as the pointer address and previously stored in a register of DCW register decoder 46.

A detailed description will now be given of the structure of the major components and signals as shown in FIGS. 5 through 10.

One type of addressing employed in the storage system of the described embodiments is relative addressing, which is well-known in the art. Relative addressing is the employment of memory addresses which are not the identity of exact memory locations, but are only relative to a reference location. The reference location is determined by the operating system when the program or data control words are loaded into main memory. Relative addressing is a technique required in multiprogramming for optimizing the location of data words in memory 10. In this manner the data control words can be located in a specific portion of memory 10 with each of the relative addresses being directed to that specific portion of memory 10 through the use of base addresses which will be described hereinafter.

The following conventions in terminology and notation are to be followed in the drawings and the following description. It will be noted in the drawings that there are wide connecting lines and narrow connecting lines. A wide connecting line indicates a number of conductors or a cable of conductors, whereas a narrow connecting line indicates a single conductor.

Extended memory controller logic blocks are made up of conventional storage and shift registers, counters, flip-flops, OR-gates, AND-gates, inverters, comparators, pulse distributors, decoders, encoders and control matrices which are well-known in the art and which operate in a normal manner. The extended memory controller logic blocks will be described in detail hereinafter.

The term "control matrix" as used in the following description comprises a set of gates provided to route logic level signals, hereinafter referred to as binary 1 signals or binary 0 signals throughout the extended memory controller. For example, the control matrix consists of OR and AND-gates, certain of which will be enabled when a given output line from a decoder is present as an input together with a timing signal to provide outputs for sequencing operations. The control matrix must therefore control the distribution of signals in a timed sequence to correct points throughout the machine in response to the receiving of certain time related signals and certain decoded control signals.

In the description hereinafter the term "read" is used to specify an operation of retrieving information from extended memory 12 and transferring the information to memory 10 for storage. The term "write" is used to specify an operation of retrieving information from memory 10 and transferring the information to extended memory 12 for storage.

Memory controller 18 may be of a type disclosed in copending patent application by David L. Bahrs, John F. Couleur, William A. Shelly and Richard L. Ruth entitled "Intercommunicating Multiple Data Processing System," assigned to the General Electric Company and bearing the Ser. No. 555,491 and filed on June 6, 1966.

The signal conductors which couple together the major components of memory controller 18 and extended memory controller 16 are illustrated in FIG. 5. Operation of memory controller 18 is described in the aforementioned copending patent application. Memory controller 18, in the following description, provides access to memory 10 by extended memory controller 16.

Processor 14 may be of a type disclosed in the aforementioned copending patent application. Processor 14 is coupled to memory controller 18 to provide the communication signals, to be described hereinafter in the detailed description of extended memory controller, as required for retrieval and storage of information in memory 10 under control of operating system programs which are stored in memory 10.

Memory 10 has been previously described with reference to FIG. 1. One form of memory suitable for employment as memory 10 is the coincidence current magnetic core type of random access memory well-known in the art. Memory 10 is of the well-known double precision type wherein two words in two locations with consecutive addresses are addressed simultaneously with one even numbered address and the two words are transferred to memory controller 18 successively one word at a time during a double precision memory cycle time. For example, the address of an even numbered location will automatically address the even numbered location and the next higher numbered odd location, such as locations 100 and 101. During a double precision memory cycle time, two words may be stored or retrieved in any two memory locations with consecutive numbered addresses, where the first location has an even numbered address.

Memory 10 as illustrated in FIG. 1, may have various capacities for storage. One memory which may, for example, be employed with the instant invention has capacity for storing approximately 32,000 data words, each word comprised of 36 binary digits. Each binary digit of a word is stored in a corresponding magnetic core. The location of a particular word is identified by a number stored in address register 26 and a particular word is retrieved from or entered into memory storage cells 24 at the location identified by the contents of address register 26. Memory storage cells 24 store information words including instruction words, operand words, and control words at any random address cell or in groups of memory cells. As the term is used herein, random access pertains to the process of obtaining data from or placing data into storage where the time required for such access is independent of the cell of the information most recently obtained or placed in storage.

Each DCW currently arranged for execution in a specific order by the operating system is located in a set of cells with consecutive addresses as illustrated in the memory maps of FIGS. 1, 2 and 3. Each cell stores a DCW corresponding to a sector accessible during a cycle of circulation of extended memory 12 as previously described. Since each DCW contains the address of the next DCW pair, a string of randomly located DCW's can be linked together or the DCW stored in a cell corresponding to an ending sector of a cycle of circulation may be linked to the DCW in a cell corresponding to a starting sector of a cycle of circulation. The particular memory 10 employed with the present invention has a memory cycle time of 1 $\mu$sec. During which two words may be stored or retrieved during a double precision memory cycle. A DCW is stored at two memory cells with consecutive addresses where the first location has an even numbered address while other program information words to be transferred are stored in groups of cells whose addresses are consecutive. In the illustrated embodiment of FIG. 5, words are transferred from extended memory 12 in blocks of 64 words to be stored in 64 main memory locations whose addresses are consecutive. Words transferred in the opposite direction of transfer are retrieved from 64 main memory locations, whose addresses are consecutive, for transfer to extended memory 12.

One cell of memory 10 is reserved for storing the pointer address previously described for use by the operating system. The address of the cell storing the pointer address is derived from a base address provided by control panel base address switches 94 illustrated in FIG. 3 and applied to memory controller 18 by extended memory controller 16 each time that the pointer address is to be stored.

Control of memory controller 18 and extended memory 12 by extended memory controller 18 requires certain distinct communication signals. The cables providing communication and data transfer paths between extended memory 12 and memory controller 18 are illustrated in FIG. 1 by interconnecting line 17. Interconnecting line 17 symbolically represents a cable. Thus, N bus 74, U bus 86 and control bus 85 of FIG. 5 are represented by line 17 in FIG. 1.

Figure 6:
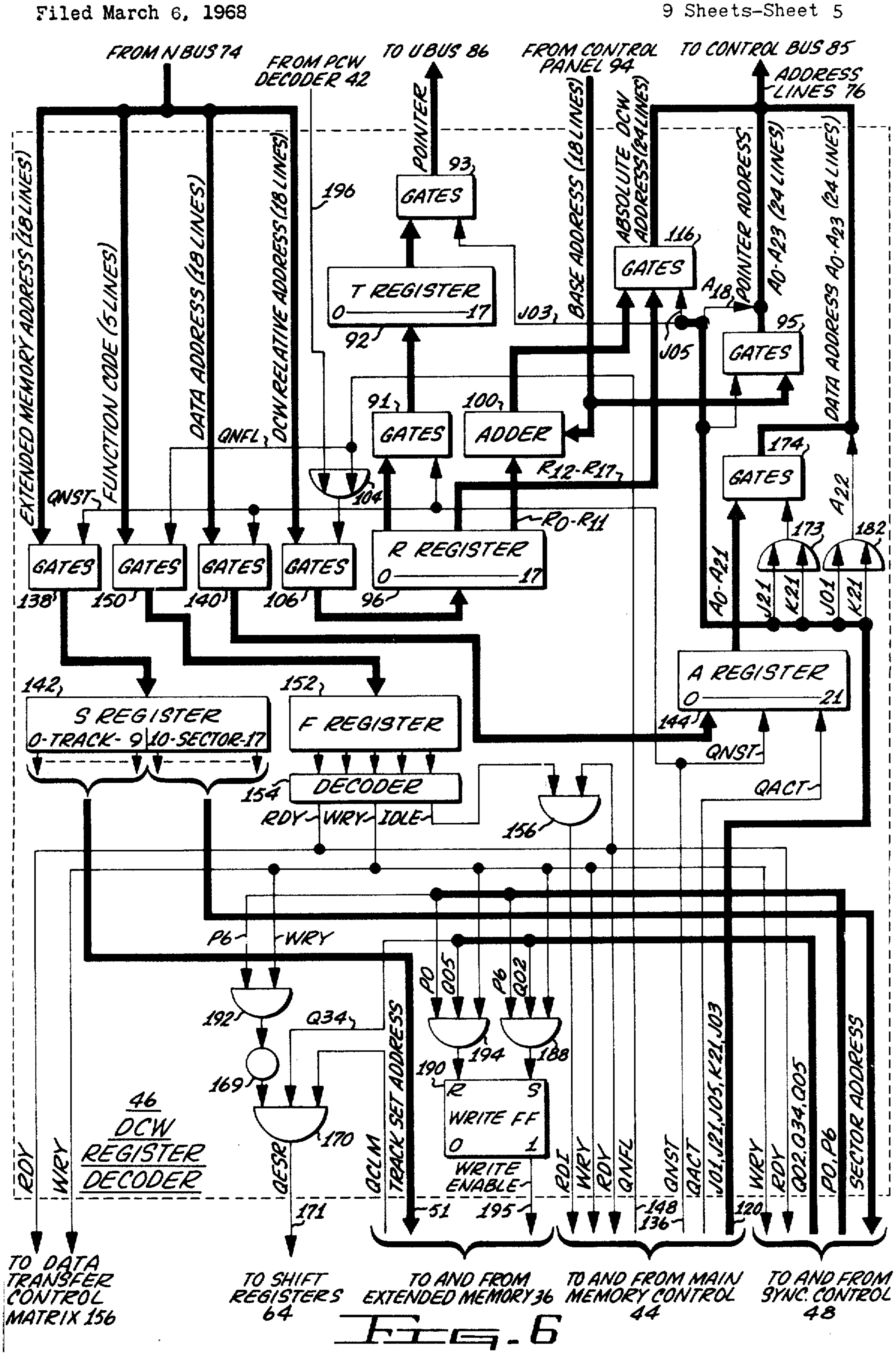
FIG. 6 is a block diagram of the main memory control of FIG. 3.
Figure 7:
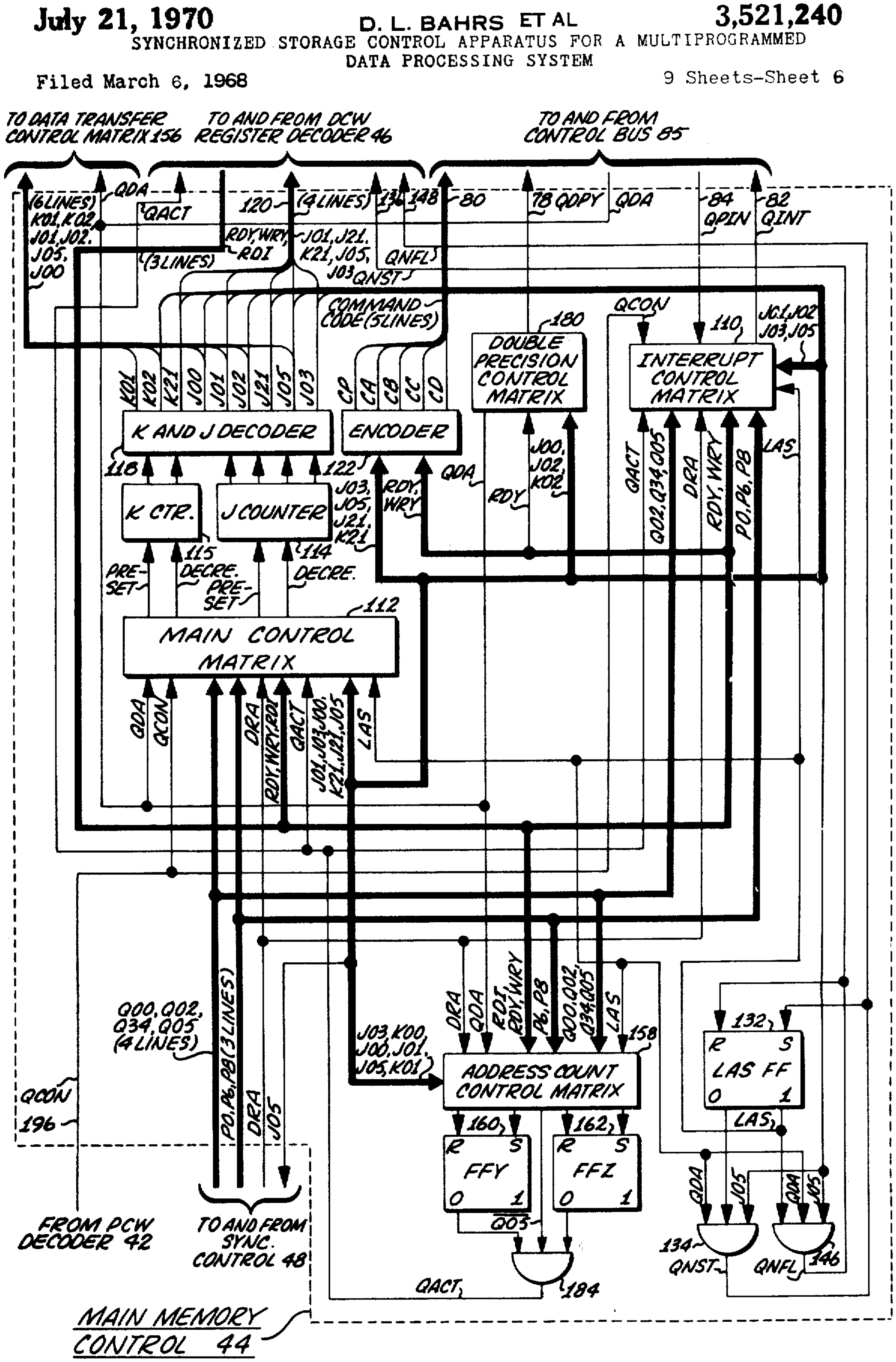
FIG. 7 is a block diagram of the data control word register decoder of FIG. 3.

Information, address and control signals which are transmitted between memory controller 18 and extended memory controller 16 are as designated in FIGS. 5, 6 and 7. In the illustrated embodiment the interconnecting conductors providing communication paths between extended memory controller 16 and memory controller 18 are all contained within N bus 74, U bus 86 and control bus 85 as illustrated in FIG. 5. All information is transferred as 36 bit words on 36 data lines of U bus 74 and 36 output data lines of N bus 86 as shown.

The N and U buses communicate selectively through data input gates 40 and data output gates 41, four 36 bit holding registers 174 and other logic blocks of extended memory controller 18. The U bus provides data for transfer to memory controller 18 from the four 36 bit holding registers. The N bus receives the output of the memory controller and applies these output signals directly to PCW decoder 42 (bits 18 and 19) and selectively into the four 36 bit holding registers 174 and selectively into registers of DCW register decoder 46.

The N and U buses are each connected to data input gates 40 and data output gates 41 respectively. Gates 40 are each comprised of a plurality of gates for selectively controlling the transfer of 36 bit words, one word at a time into different ones of four 36 bit holding registers 174. Gates 41 are comprised of a plurality of gates for selectively controlling the transfer of 36 bit words, one word at a time out of different ones of four 36 bit holding registers 174. Data input gates 40 transfer one word therethrough in response to each of the four designated signals on lines 186 while data output gates 41 respond to each of the four designated signals on lines 179. FIGS. 5 and 6 illustrate in detail the logic blocks of DCW register decoder 46 and main memory control 44. In these figures, the control signals which are transmitted and received through control bus 85 are identified. The N bus lines are also selectively connected to the A, F, R and S registers of DCW register decoder 46 through gates 140, 150, 106, and 138 respectively, in response to signals from main memory control 44.

Control bus 85 provides for receiving and transmitting all control signals, other than information signals between memory controller 18 and extended memory controller 16. Control signals transmitted to memory controller 18 are 24 address signals applied to control bus 85 on 24 lines of cable 76, a five bit binary coded command designated as command code on 5 lines identified by reference numeral 80, a QDPY pulse on line 78, and a QINT pulse on line 82. Control signals received by extended memory controller 18 by means of control bus 85 are a QDA pulse on line 90 and a QPIN pulse on line 84. The control signals identified in the preceding description corresponding to the signals designated as addr. lines (18 bits/chan.), CMD code lines & prot. line (5 bits/chan.), DBL. Prec./rewrite line (1 $DP/chan.), Chan. Int. Line $I, $DA, and $Pin in the previously cited pending patent application.

The address applied to the memory controller comprises 24 bits. The first bit of the address is termed the most significant bit and the last bit is termed the least significant bit of the address. The bits between the most and least significant bits are accorded successively decreasing orders of significance. The entire binary numeric address represents a number of 24 bits. The first bit of the address lines delivered on line $A_0$ as illustrated in FIG. 6 is the most significant bit and the twenty-fourth bit delivered on line $A_{23}$ is the least significant bit. The remaining bits are accorded successively decreasing orders of numerical significance, depending on their respective positions between the most and least significant bits. The twenty-fourth bit of the binary numeric address represents $2^0$, the decimal number 1, when the twenty-fourth bit in a binary 1. The twenty-third bit represents $2^1$, the decimal number 2, when the twenty-third bit is a binary 1. The twenty-second bit represents $2^2$, the decimal number 4 when the twenty-second bit is a binary 1.

Address lines of cable 76 provide 24 address signals; however, only the signals representing the 18 least significant address bits are accepted by the memory controller of the illustrated embodiment. Addressing as described hereinafter will be presented utilizing a 24 bit address.

Addresses from DCW decoder 46 are selectively transferred through gates 116 and 174 to control bus 85 in response to signals on lines 120 from main memory control 44. Gate 182 is also enabled by signals on lines 120 to provide a binary 1 signal on address line $A_{22}$ during main memory information transfer operations. This has the effect of incrementing the main memory address by 2 during every 4 word transfer operation with main memory.

Figure 8:
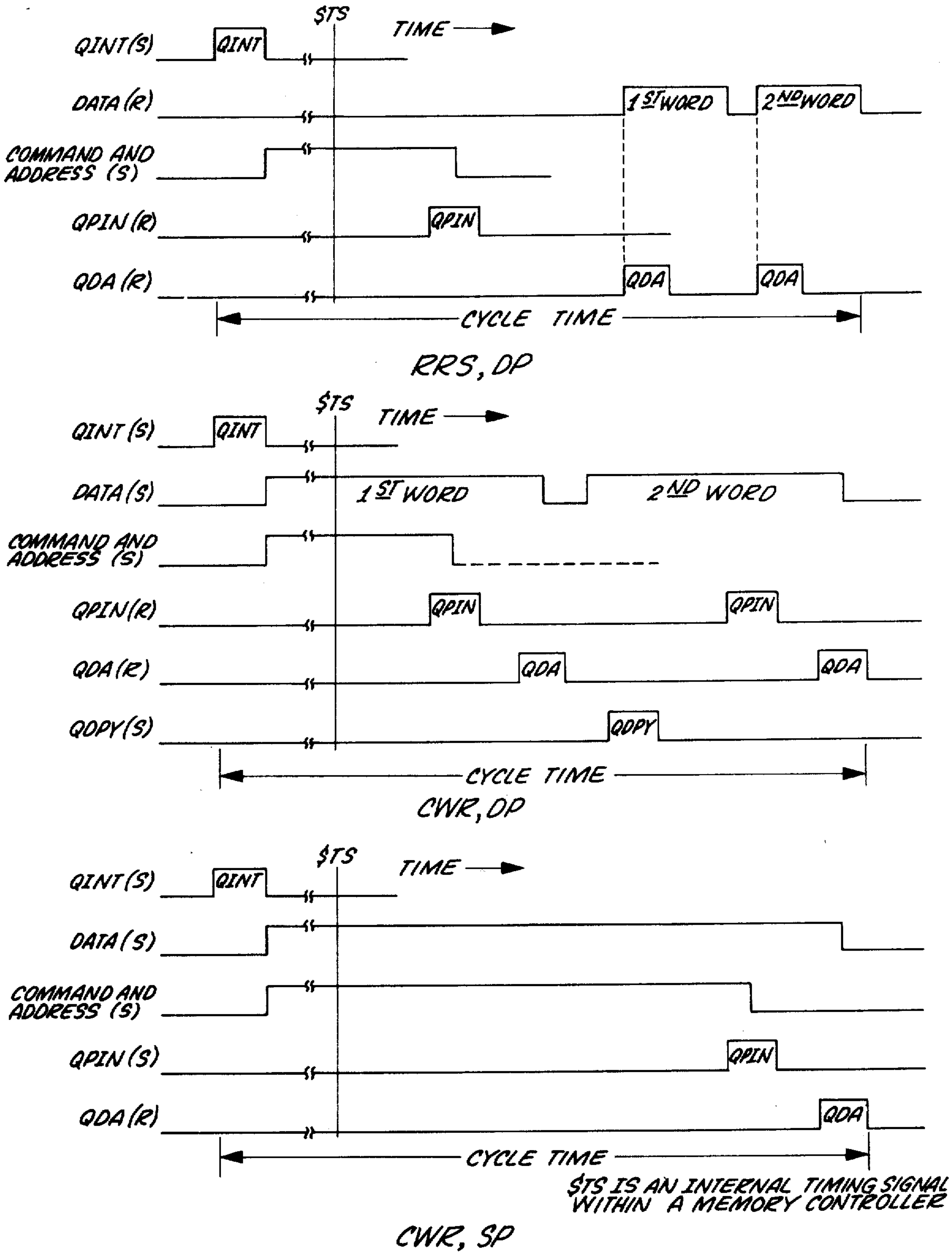
FIG. 8 illustrates waveforms of control signals transmitted between the memory controller and extended memory controller.

Control bus 85 provides one remaining control signal not described in the preceding description or illustrated in the waveforms of FIG. 8. As shown in FIG. 5, a signal designated ACN1 is provided on line 88 of control bus 85. The QCN1 signal is suppiled by memory controller 18 during operating system initialization of extended memory controller 16 to perform a desired operation. When a QCN1 signal is present on line 88 and applied to PCW decoder 42, the PCW supplied on N bus 74 in response to the operating system is decoded. Signals resulting from the decoded PCW either initiate operation of extended memory controller 16 or provide for an emergency disconnect operation to terminate an operation in process as designated by bits 18 and 19 of the PCW.

PCW decoder 102 receives bits 18 and 19 of the PCW memory controller 18 as provided by N bus 74 lines designated as N 18, 19 in FIG. 5. Bits 18 and 19 are decoded during initiation of the operation of extended memory controller 16 when a QCN1 signal is recevied from memory controller 18 on line 88. The decoded binary configuration provided by bits 18 and 19 may specify one of the operations, shown in the following table, to be performed by extended memory controller 16.

| Bits 18, 19: | | Operation |
|---|---|---|
| 0 | 0 | Emergency Disconnect. |
| 1 | 0 | "Start," Retrieve Data Control Word Pair. |
| 0 | 1 | Housekeeping Operation. |

N bus 74 provides for entry of both PCW's and DCW's into extended memory controller 16. Each PCW controls the extended memory controller while each DCW pair provides for control of main and extended memories. If a housekeeping operation is specified by bits 18 and 19 of a peripheral control word, a housekeeping operation not material to this invention is performed. If an emergency disconnect operation is specified by bits 18 and 19, an emergency disconnect operation, an understanding of which is not required for an understanding of the present invention, is performed. With reference to FIG. 6, if a "start" retrieve data control word pair operation code is specified by bits 18 and 19, a QCON signal is provided on line 196 to DCW register decoder 46 to enable OR-gate 104 and gates 106 for providing transfer of 18 binary signals on 18 lines, designated in FIG. 6 as DCW relative address lines, into R register 96. The DCW relative address in R register 96 is thus available to address main memory during a DCW retrieval operation. The QCON signal is also applied on line 196 to main control matrix 112 of main memory control 44 to initiate a DCW retrieval operation.

In the waveforms illustrated in FIG. 8, the information, address, and control signals that the memory controller receives from extended memory controller 16 during main memory access cycles are identified. The information and control signals that the memory controller transmits to the extended memory controller during main memory access cycles are also identified. In the system of the instant invention, the extended memory controller is capable of issuing main memory cycle commands to the memory controller. Three of the main memory cycle commands are to be described in detail hereinafter. The commands are represented by five signals representing a five bit binary code. Signals representing the five bit binary code are transmitted by means of command lines 80 to memory controller 18. These commands are designated as RRS,DP, CWR,DP and CWR,SP in FIG. 8 and hereinafter in the structural and operational descriptions of main memory controller and an extended memory controller for controlling the access to memory 10.

Following receipt of a PCW initiating a "Start" retrieve data control word operation, the extended memory controller is always in one of two phases, each requiring control of main memory; the retrieve data control word cycle or the control cycle. In the retrieve data control word cycle, the extended memory controller 16 retrieves DCW1 DCW2 from a pair of storage locations in memory 10, stores a pointer address hereinafter referred to as pointer indicium in a storage location of memory 10 and transfers the function portion to F register 152 of the DCW register decoder 46 to determine the type of control cycle to be entered. In the control cycle, the controller 16 controls the type of storage operation to be performed by memory 10 and extended memory 12 under control of the function signals provided by F register decoder 154. The particular type of storage operation to be provided by memory 10 and extended memory 12 is determined by one of three signals which is present at the output of decoder 154; namely RDY, WRY or IDLE.

Main memory control 44, FIG. 7, comprises a four stage J counter 114 comprising four flip-flops to provide control signals during all transactions with memory 10. The J counter in its defined states J02, J01 or J00 is used to provide control during four 36 bit word transfers to and from memory 10, while in its defined states J03 and J05 is used to provide signals for storing pointer indicium in memory 10 and retrieval of DCW's from memory 10 respectively. K counter 115 is a two stage counter comprising two flip-flops to provide control signals during a four word double precision data transfer to memory 10. The K counter in its defined states of K00, K01 and K02 provides control signals for transferring the third and fourth 36 bit words during a four word transfer to and from memory 10.

Main control matrix 112 receives signals from PCW decoder 42 on lines 191 and 196 to preset the J counter to a state of J00 or J05 when a PCW is received and decoded to initiate a specified operation. Main control matrix 112 also receives the previously described IDLE, DIS, RDY and WRY signals from R register 152, with other signals to be described in detail hereinafter to preset and decrement the K and J counters during or following four word memory transfers. K. and J decoder 118 decodes the output signals from flip-flops of the K and J counters to provide K01, K02, K00, K21, J00, J01, J02, J21, J03 and J05 timing signals for distribution to logic blocks throughout extended memory controller 16. The K21 and J21 signals designate that the K and J counters are in the K1 and K02 and J01 or J02 states respectively.

Address count control matrix 158 in conjunction with the flip-flaps FFY and FFZ and gate 184 provides for incrementing the address represented by the contents of A register 144 by a count of 4 following each four word transfer of information involving memory 10.

Control for transferring a pair of DCW's from memory 10 is provided by the J counter J05 state and a flip-flop 132 designated LAS FF. When the LAS flip-flop is in a reset state, AND-gate 134 is enabled by a QDA signal provided by memory controller 18 to indicate that DCW1 is present on N bus 74 from memory controller 18. The binary 1 output signal from gate 134 when in its enabled state is designated as QNST. When the QNST signal is a binary 1, it enables gates 138 and 140 of DCW register decoder 46, FIG. 6, to transfer signals representing the extended memory address and data address of DCW1 into the S and A registers respectively, of decoder 46. Signals representing the data address are transferred into the A register for storage in flip-flops representing the 18 most significant address bits while the QNST signal is applied directly to the A register to reset flip-flops representing address bits $A_{18}$–$A_{21}$ to their binary 0 state. The QNST signal is also applied to the S input of LAS flip-flop 134 to provide for switching flip-flop 132 to its binary 1 state. Gate 146 is enabled by the coincidence of LAS FF 132 being in the binary 1 state and a QDA signal which is deceived from memory controller 18 indicating the presence of DCW2 on N bus lines 74. Gate 146 in its enabled state provides a binary 1 output signal designated QNFL. The binary 1 QNFL signal enables gates 104, 106 and 150. Gates 106 and 150 in their enabled state provide output signals to control transferring the function code and DCW relative address portions of DCW2 into the F and R registers respectively.

Encoder 122 responds to J03, J05, J21, RDY and WRY signals to apply a five bit binary coded command, by means of lines of cable 80, to memory controller 18. Outputs from encoder 122 designated as CP, CA, DB, CC and CD, FIG. 7, are applied to lines of cable 80 for transmittal to controller 18. The commands generated in extended memory controller 16 which are described in the following description are the read-restore double precision hereinafter designated as RRS,DP and clear-write, double precision hereinafter designated as CWR,DP and clear-write single precision hereinafter designated as CWR,SP. With five command code lines available it is possible to generate as many as 32 different 5 bit combinations to represent commands. The binary coded output signals for RRS,DP; CWR,DP; and CWR,SP are as follows:

| Output Lines | CP | CA | CB | CC | CD |
|---|---|---|---|---|---|
| Command: | | | | | |
| RRS, DP | 1 | 0 | 0 | 0 | 1 |
| CWR, DP | 1 | 0 | 1 | 0 | 1 |
| CWR, SP | 1 | 0 | 1 | 0 | 0 |

The extended memory controller and memory controller exchange control and information signals as illustrated by the main memory timing signal waveforms of FIG. 8 for the RRS,DP, CWR,DP and CWR,SP commands.

Double precision control matrix 180 and interrupt control matrix 110, FIG. 7, provide output signals QDPY on line 78 and QINT on line 82 respectively in a timed relationship to the QDA and QPIN signals received on lines 90 and 84 respectively from memory controller 18. The QDA signal indicates that data signals from main memory can be entered into the extended memory controller or that data signals from the extended memory controller have been received. The QPIN signal indicates that the address and command signals have been accepted by the memory controller. The extended memory controller interrupts memory controller 18 and requests an operation by means of sending the QINT signal, generated by enabling interrupt control matrix 110, which serves as an access request signal. The QDPY signal is used during a CWR,DP function to indicate to memory controller 18 that the second 36 bit data word is now present on data lines 86. Further explanation of the timing signals will be given in the detailed operation description hereinafter utilizing RRS,DP, CWR,DP and CWR,SP commands.

Extended memory controller 16 transmits one 36 bit word at a time to memory controller 18 over 36 data lines designated as U bus 74, 24 address bits over 24 address lines 76, a double precision rewrite signal over one line 78 designated as QDPY, and five command code signals over lines within cable 80 to provide control communication enabling the controller to control a retrieval or storage operation by memory 10. The 36 data lines of U bus 74 present a 36 bit data word to the memory controller for storage of the information in memory 10. The address lines include a 24 bit address which selects a 72 bit word contained in two locations with consecutive addresses of memory 10. The least significant address bit is utilized to retrieve or store either the upper or lower half of the 72 bit word that is stored or retrieved in memory 10.

Control panel base address switches 94 shown in FIG. 5 are conventional manual switches which may be set to apply 18 binary signals to base address lines 98. The signals present on lines 98 are utilized by extended memory controller to form absolute addresses and to form an address for storing a pointer in memory 10 as will be described hereinafter during a description of DCW register decoder 46 and main memory control 44.

The memory controller is associated with memory 10. As previously described, the memory controller in the illustrated embodiment utilizes an 18 bit address thereby rendering it possible for a memory controller to provide addresses for controlling access to 256K locations. Data transfers between communicating devices and the memory controller are word oriented and in the embodiment chosen for illustration two successive 36 bit words are transferred for double precision transfers. The memory controller and its associated core systems operation on a 72 bit basis and a 72 bit word is accessed in memory 10 for each memory address. The 72 bits correspond to two instructions, two operand words, or two control words. The memory controller receives commands from the communicating devices and once a communicating device has been awarded access the command sent by it to the memory controller is decoded and performed.

Extended memory 12 may be of a type well-known in the art. Extended memory 12 is illustrated in FIG. 5 as comprising a storage unit, which is by way of example, in the form of a set of magnetic discs or a magnetic drum or it may assume any other suitable known configuration or design. In the following description the extended memory storage unit will be referred to hereinafter as a drum storage unit.

Extended memory 12 is operated in a parallel manner such as described in Digital Computer Fundamentals, Thomas C. Bartee, Lincoln Laboratory, MIT, published by McGraw-Hill Publishing Company, Inc., 1960, pp. 239–243. Memory 12 is operated under control of access control 22 which is illustrated in FIG. 5 as being comprised of read amplifiers 66, write amplifiers 68, track address selection matrix 50 and synchronization signal amplifiers 49. During parallel operation 16 bits are written simultaneously or read simultaneously. When the extended memory is read from or written into in parallel, a separate read and write amplifier is required for each track that is used simultaneously. Therefore to read 16 bits each bit time, 16 read amplifiers 66 are provided. To write 16 bits each bit time, 16 write amplifiers 68 are provided. As the drum rotates, a small area continually passes under each of read/write heads 38. This area is known as a track. Each track length is subdivided into cells, each of which can store one binary bit. A plurality of successive cells are grouped together to provide the addressable areas previously described as sectors, wherein each sector contains a predetermined number of data words. In the particular example under consideration a sector is comprised of a block of 64 words of 36 bits each.

Information to be transferred between extended memory 12 and memory 10 is stored in a plurality of adjacent tracks 60 and in a plurality of sectors 62 in each of the tracks 60 of rotating discs 37. Sixteen such adjacent tracks are grouped together to provide track sets, FIG. 5. Since there are a number of track sets, the correct set of 16 read/write heads 38 associated with each track set as well as the sector of the tracks must be addressed. Each track set is therefore assigned an address representative of the number of the track set. In order to specify the address of a sector, the track set address and sector address are specified and stored, for example, in an address register illustrated as the S register in FIG. 6. The track set address is included in DCW1, FIG. 2, in bit positions 0–9 and applied to track address selection matrix 50, FIG. 5. Track address selection matrix 50 responds to signals representing the track set address to provide one output signal for simultaneously activating a selected set of 16 heads. Appropriate sector selection means is included in the synchronization control 48 to select the proper sector containing the desired information words. The sector address is included in DCW1 as illustrated in FIG. 2 in bit positions 10 through 17.

Figure 9:
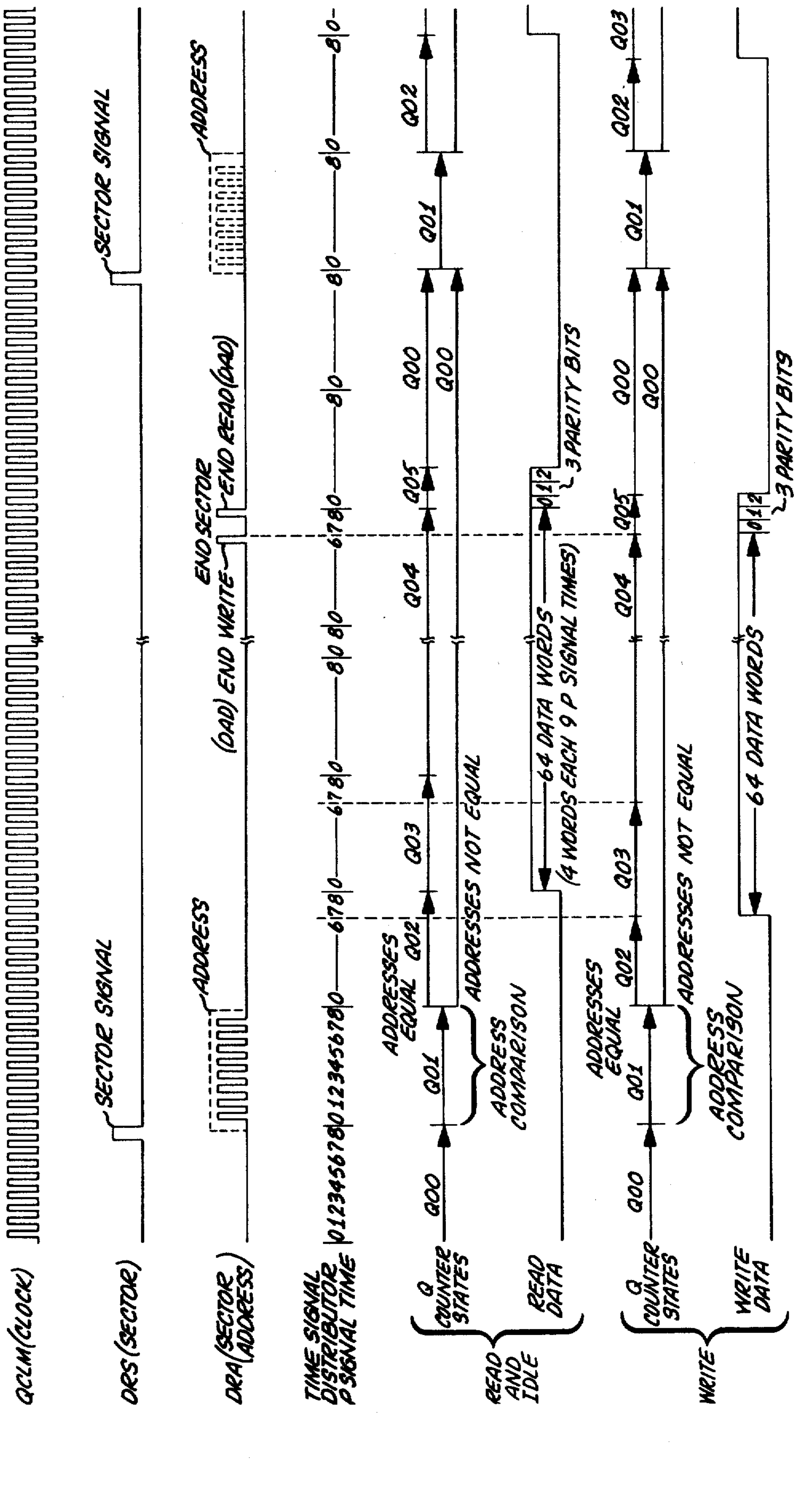
FIG. 9 illustrates waveforms and timing diagrams of the various signals supplied by the extended memory and the extended memory controller of FIG. 5.

Extended memory controller 16 locates the specified sector by employing three waveforms representing timing signals as illustrated in FIG. 9 to locate the specified sector. These three waveforms are received from timing signal amplifiers 49 of access control 22 which receives the waveforms from timing signal sources 47 of extended memory 12. The QCLM master clock waveform represents a series of timing signals each signal appearing at a time corresponding to the accessibility of a respective bit cell, as the drum rotates. A second waveform identified as the DRS (Drum Sector) waveform represents a series of signals. Each signal identified as a "sector" signal appears at a time corresponding to the accessibility of the beginning of each sector as the drum rotates. The sector signals of waveform DRS are spaced 180 bit cells apart such that the basic sector is 180 bit cells in length. In addition, a third waveform designated as the DRA (Drum Sector Address) waveform provides signals representing the sector number of the accessible sector along the track. Immediately following each of the previously described sector signals the extended memory controller receives the sector numbers or addresses from the DRA waveform. The extended memory controller serially reads the waveforms representing the sector number and when this number agrees with the representation of the sector number stored in the S register, the extended memory controller can then control the reading or writing of information in the addressed sector.

The DRA waveform, FIG. 9, also includes a pair of signals designated as end sector-end write (DAD) and end sector-end read (DAD) which represent the ending portion of each sector area utilized during writing and reading respectively. The end sector-end read signal controls termination of read operations. The end sector signals control terminating data transmission if the transmission has not already been terminated by reason of some other condition. The end sector-end write (DAD) signal represents the completion time for writing data into extended memory 12 while the end sector-end read (DAD) signal represents the completion time for reading data from extended memory 12. The storage space utilized in each sector is thus defined by the end sector signals. When an end sector signal is sensed, control is provided for terminating the transmission of data.

Communications between the extended memory controller and access control 22 are provided by means of a cable designated as line 20 in FIG. 1 which will hereinafter be referred to as cable 20. Cable 20 comprises the plurality of lines and cables illustrated in FIGS. 5 and 6 which include lines to access control 22 designated as track set addr. (10 lines), cable 51 contained within cable 20, write enable line 195 and 16 data lines 69. Cable 20 also includes lines from extended memory 12 providing the three waveforms previously described and received on 3 lines of a cable designated as QCLM, DRA and DRS, and 16 data lines 67 connected to shift registers 64.

Control of a rotating type memory is well-known in the art. Synchronization control 48 receives the three waveforms as previously described, from access control 22. In the illustrated embodiment, the S register of DCW register decoder 46, FIG. 6, stores the sector address of the desired sector. Synchronization control 48 compares the sector address portion of the S register with each of the series of addresses received on the DRA line from the access control 22 until coincidence is achieved. For example, in the illustrated embodiment a series of 8 binary signals designated as "address" on the DRA waveform in FIG. 9 and providing a representation of a sector number, is supplied at the beginning of each sector by extended memory 12. The representation of the sector number is then compared with the sector address contained in the S register until coincidence is obtained.

Within synchronization control 48 is a counter comprised of four flip-flops (not shown) which is designated as the Q counter which provides timing signals Q00–Q05 in the sequence shown by the timing diagram of FIG. 9. The Q counter is a conventional counter, which is incremented one count for each change of operation to provide the states indicated in the following table.

| Q counter state: | Control operation |
|---|---|
| **Q00** | Rest State. |
| **Q01** | Compare Sector Address. |
| **Q02** | Read-Rest Time<br>Write-Retrieve 4 words from Main Memory. |
| **Q03** | Read or Write Data. |
| **Q04** | Do. |
| **Q05** | Parity Checking. |

The Q counter provides control signals during all transactions with extended memory 12. A signal designated as Q34 is also provided which indicates that the Q counter is in a state of Q03 and Q04.

Synchronization control 48 also includes a conventional timing signal distributor, such as for example, a ring shift register or counter (not shown) which is suitable for providing 9 bit timing signals $P_0$–$P_8$ corresponding to each binary 1 portion of the clock signal provided by the QCLM waveform. The P timing signals are illustrated in FIG. 9 and are supplied throughout extended memory controller 16 to time various operations as will be described hereinafter. P timing signals provide synchronism with the address waveform from access control 22 and insure sampling of information bits at the proper time. The time interval for the occurrence of the $P_0$ through $P_8$ signals represents the extended memory 9 bit interval termed a "character time," therefore all shifting of 16 nine bit character shift registers 64 is controlled by shift signals generated under control of P timing signals. The parallel transfer of information between the shift registers and holding registers is also controlled by the P timing signals.

Transfer of information within extended memory controller 18 is provided by data transfer control matrix 156 and transfer gates 172 which provide for parallel transfer of information between the shift registers and holding registers. Data transfer control matrix 156 also provides control signals for controlling the transfer of information between the holding registers and the N and U buses. Data transfer control matrix 156 receives RDY, WRY, K01, K02, J01, J02, J05, J00, $P_6$, Q02, Q34 and end of sector signals from DCW register decoder 46, main memory control 44, synchronization control 48 and access control 22. Data transfer control matrix 156 responds to these signals to provide timing signals during information transfer operations as described in the operation description hereinafter. Holding registers 174 have a capacity of four 36 words or a combined length of 144 flip-flops. They are used as buffer or holding registers for the four words transferred in a main memory information transaction. Since each register contains 36 bits, data transfer control matrix supplies separate control signals for each register during a transfer between main memory and the holding registers.

As shown in FIG. 5, four signals designated as QNCO, QNC5, QPDO, and QPD5 are applied to 4 lines within cable 186, and four signals designated QCOU, QCBU, QDOV, and QDBV are applied to 4 lines within cable 179. The QNCO, QNC5, QPDO, and QPD5 signals are applied successively to separate sets of 36 gates each within data input gates 40 to transfer one 36 bit word at a time into a respective one of first, second, third, and fourth registers of four 36 bit holding registers 174. In a similar manner, the QCOU, QCBU, QDOV, and QDBV signals are applied successively to separate sets of 36 gates each within data output gates 41 to transfer one 36 bit word at a time from a respective one of first, second, third, and fourth registers of four 36 bit holding registers 74 to U bus 86. The QECT signal controls certain ones of transfer gates 172 for transferring signals representing the contents of the 16 shift registers to the four holding registers. The combined shift registers are comprised of 144 flip-flops and are used as extended memory information buffer registers. Each of the 16 shift registers are nine bits in length. During a write operation by extended memory 12, information bits are shifted out of the least significant bit position of each nine bit shift register to the extended memory on data lines 69 by shifting each shift register in response to clock shift signals provided from gate 170 of the DCW register decoder 46, FIG. 6. During a read operation, information bits are entered into the most significant bit positions of the shift register from extended memory data lines 67 by these same shift signals. These shift signals occur at the frequency of the master clock (QCLM) signals. Transfer of data to the holding registers is controlled by transfer gates 172 which are comprised of two separate sets of 144 gates to provide for parallel transfer of the shift register contents to the holding registers in response to signals applied by data transfer control matrix 156.

When a pair of DCW's are retrieved from main memory, gates 138, 150, 140, and 106, FIG. 6, are selectively enabled as previously described to transfer portions of DCW1 and DCW2 into the S, F, A, and R registers. Addresses for main memory are provided by the A, R, and T registers 96, 92, and 144, respectively, adder 100, and control panel base address switches 94. The base address switches provide 18 binary input signals representing a base address, which are applied to adder 100 and gates 95 by means of cable 98. The R register is an 18 bit register used to store the relative address of the next DCW to be retrieved from main memory by the controller. The 12 most significant bits designated $R_0$–$R_{11}$, in the R register are added to the 12 least significant bits of the base address signals on cable 98 to form the 18 most significant bits of the absolute address of the next DCW. The six signals representing the 6 least significant bits of the R register are applied unmodified to gates 116 to form the remaining six bits of the 24 bit absolute address. Since each DCW provides a pointer address which may serve as a link address specifying the next DCW cell in a string of cells, the extended memory controller can continue retrieving data control words and transferring data between memories without program attention. When the controller is in the not-busy state, and a QCN1 signal is received, the relative address is loaded from the PCW accompanying the QCN1 signal as previously described. Adder 100 is a conventional parallel binary adder which forms the sum of an 18 bit operand and a 12 bit operand provided by the control panel base address switches 94 and R register, respectively.

The T register 92 is an 18 bit register used to store binary bits representative of the address of the current DCW stored in extended memory controller 16. The binary bits representative of the address of the next DCW which are present in the R register are transferred to the T register at the time of retrieval of the next DCW, thus the T register contains the binary bits representing the address of the current DCW. Following retrieval of each DCW, the contents of the T register are stored at a cell of memory 10 addressed by the base address signals from control panel 94 plus a binary 32. The stored address represents the pointer indicium previously described for use by the operating system.

The A register 144 is comprised of 22 flip-flops for storing binary bits representative of the main memory address to be involved in an information transfer. The extended memory controller provides 24 lines of cable 76 designated as $A_0$–$A_{23}$, representing a main memory data address, to the memory controller. The A register flip-flops are coupled only to lines designated as $A_0$–$A_{21}$ of cable 76. During an information transfer, the twenty-fourth line ($A_{23}$), corresponding to the least significant bit of the data address, always has a binary 0 signal applied, since the main memory cycle will always be double precision requiring an even-numbered address. The twenty-third line ($A_{22}$), corresponding to the seventeenth bit of the data address, has a binary 0 signal applied during transfer of the first word pair of a four-word transfer, and a binary 1 signal applied during the transfer of the second word pair in a second double precision cycle. At the end of a four-word transfer, the A register is incremented by one by the QACT pulse from main memory control 44. The QACT pulse is applied to each flip-flop of the A register, which performs as a counter, to increase the A register count by 1 in a manner well-known in the art. Since the twenty-second line ($A_{21}$), corresponding to the twenty-second bit of the data address, receives the output signal from the A register flip-flop representing the twenty-second address bit, the address portion supplied by the A register is actually increased by a count of 4.

S register 142 is comprised of 18 flip-flops for storing bits representative of the extended memory address of information to be involved in an information transfer operation. The most significant 10 bit track portion, designated as bits 0–9, FIG. 6, selects the required track set. The least significant 8 bits sector portion, designated as bits 10–17, is used to select the required sector. The track portion is applied on lines 51 to track address selection matrix 50 of access control 22 immediately following transfer of DCW1. The least significant 8 bits of the S register are, for example, in the illustrated embodiment, applied to synchronization control 48 for serial comparison with the extended memory sector address supplied by waveform DRA of FIG. 9. Comparison of the sector address provided by the DRA waveform from access control 22 is provided during the Q01 state of the Q counter which provides for the sector address compare time.

DCW register decoder 46 includes the F register 152 which is comprised of five flip-flops whose states are decoded by F decoder 154 to provide signals IDLE, RDY, and WRY function signals to control the type of storage operation of both main and extended memory.

Control of access control 22 to provide for a read or write operation by extended memory 12 is provided by write flip-flop 190, hereinafter referred to as write FF 190, as illustrated in FIG. 6. When a binary "1" WRY signal is applied to AND-gate 188 conjunctively with the presence of binary "1" signals at $P_6$ and Q02 times, gate 188 is enabled to provide a binary "1" output signal. The binary "1" signal is applied to the S input of write flip-flop 190, thereby setting flip-flop 190 to its binary "1" state for providing a binary "1" output signal designated as "write enable" on line 195. The binary "1" "write enable" signal is applied to enable gated write amplifiers 68, FIG. 5. Therefore, write FF 190 provides operation control of extended memory 12, enabling write amplifiers 68 to provide signals to be written by a selected set of 16 read/write heads on discs 37. At the completion of a "write" operation specified by a DCW, wherein the WRY binary 1 signal is present one one input of AND-gate 194 conjunctively with binary "1" signals at $P_0$ time and Q05 time, gate 194 is enabled. Enabled gate 194 provides a binary 1 output signal to the R input of write FF 190, thereby switching the flip-flop to its reset state, providing a binary 0 output signal on line 195 to write amplifiers 68. Write amplifiers are disabled by the binary 0 signal to prevent further writing of information on discs 37. During a read operation the write FF remains in a binary 0 state and write amplifiers 68 are inactive. Thus, the F register output provides for controlling the type of operation to be performed by extended memory 12.

DCW register decoder 46 also provides control for applying shift signals to sixteen 9 bit character shift registers during read or write operations. AND-gate 170 receives on one input line, the QCLM waveform, and provides output shift signals corresponding to each clock binary 1 signal to each of the 16 shift registers on line 171 during its enabled state. AND-gate 170 is enabled during a read operation for each binary 1 input signal provided by the QCLM waveform during the time when the Q counter is in states Q03 or Q04. During a write operation, AND-gate 192 and inverter 169 serve to inhibit gate 170 during $P_6$ time to prevent providing a shift signal at $P_6$ time when new information is being transferred in parallel from the holding registers to the shift registers. AND-gate 192 provides a binary "1" output signal during $P_6$ time to inverter 169 which, in turn, provides a binary "0" output signal. The binary "0" signal is applied to gate 170 for inhibiting the enablement of gate 170 during every $P_6$ time of a write operation.

Further details of the logic of extended memory controller 16 will be described in the following operational descriptions covering the retrieve data control word cycle of operation and control of the execution of pairs of DCW's specifying read, write, and idle operations.

Operating system program initiation of extended memory controller 16 to perform an operation is provided by a computer of a data processing system, such as in the system illustrated in FIG. 1, executing a connect instruction. Execution of the connect instruction results in memory controller 18 retrieving a PCW from memory 10. A memory controller, FIG. 5, such as memory controller 18, responds to the instruction to retrieve a PCW from memory 10, generates and supplies a QCN1 signal on line 88, FIG. 3, and supplies the signals of a PCW on lines 0–35 of N bus 74. The N bus lines providing signals corresponding to bits 18 and 19 of the PCW are connected to PCW decoder 42, and the QCN1 signal is also connected to PCW decoder 42. The timing diagram of FIG. 10 illustrates the conditions relating to a peripheral control word program start sequence, which is an operation performed by extended memory controller 18 and specified by a PCW for starting the retrieval of a DCW. PCW decoder 42 responds to the QCN1 signal and a binary 1 signal on N line 18 corresponding to bit 18 of the PCW received to generate a QCON signal.

As shown in FIG. 10, the extended memory controller must be in a rest state, indicated by the F register containing all zeros, and the J and Q counters being in their J00 and Q00 states, at the time of receiving the PCW specifying a "start" retrieve data control word operation. PCW decoder 42 decodes bits 18 and 19 when the QCN1 signal is binary 1 and when bit 18 is a binary 1 to generate the QCON signal. The QCON signal is then transmitted on cable 108 to DCW registerm decoder 46, FIGS. 5 and 6, to enable gate 104, which in turn enables gates 106, the R register transfer gates, to transfer signals on N bus lines 0–17, corresponding to bits 0–17 of the PCW into R register 96. As described previously, bits 0–17 of the PCW provide the relative address of a cell of main memory containing a DCW1 of a DCW.

The QCON signal is also applied by means of line 190, FIG. 6, to interrupt control matrix 110 of main memory control 44 to generate a QINT signal which is applied on line 82 through control bus 85 to memory controller 18.

The QCON signal is also applied to main control matrix 112. In response to the QCON signal, matrix 112 provides signals for presetting J counter 114 to a state of J05, which is the J counter state providing control signals for a retrieve data control word cycle.

The J05 signal applied to encoder 122 provides for a command code consisting of a 10001 binary signal combination at the output of encoder 122 on lines designated CP, CA, CB, CC and CD, respectively. This binary configuration corresponds to a RRS,DP command which is applied by means of the five command code lines 80 through control bus 85 to memory controller 18. Since the DCW relative address from the PCW has previously been entered into R register 96, and the 12 most significant bits applied to adder 100 along with the 18 bit base address on lines of cable 98 from control panel base address switches 94, the sum at the output of adder 100 represents the 18 most significant bits of absolute main memory address of the location containing the first of a pair of DCW's. The 18 line output of adder 100 and six least significant bits of the R register are then present at gates 116 in conjunction with the J05 signal on line 120 to enable gates 116 to transfer the 25 bit DCW absolute address signals to address lines 76 for connection through control bus 85 to memory controller 18. The J05 signal is also applied to synchronization control 48 for presetting the Q counter to a state of Q00 in anticipation of a DCW specified transfer operation. The LAS flip-flop 132 of FIG. 7 is always in the binary 0 state following a previous retrieval of DCW pairs, as will be described hereinafter; therefore, its binary 0 output signal present in conjunction with the J05 signal on input lines connected to gate 134.

Memory controller 18 responds to the QINT signal which serves as a request for access from extended memory to provide a double precision memory cycle utilizing the command code and address provided by controller 16 for retrieving a pair of DCW's from the specified memory location. During a double precision cycle for retrieval of two 36 bit words, the memory controller provides a QPIN signal acknowledging receipt of the command and address signals from control bus 85. Following the retrieval of a pair of DCW's by the memory controller from a pair of locations in memory 10, the memory controller transmits a QDA signal indicating that DCW1 is present on N bus 74 for transfer to the extended memory controller as illustrated in FIG. 8. The QDA signal in conjunction with the J05 and the LAS flip-flop binary 0 output signal enable AND-gate 134 to generate a QNST signal which is applied by means of line 136 to gates 91, 138, and 140 of DCW register decoder 46, FIG. 6.

Since the signals representing DCW1 are now present on N bus 74, the QNST signal on line 136 enables gates 138 and 140 to transfer the signals present on N bus 74 lines corresponding to DCW1, bits 0–17 into S register 142 and DCW1 bits 18–35 into the 18 most significant bit positions of A register 144. The QNST signal is also applied to A register 144 for resetting the flip-flops providing signals representing the 18–21 bits of the data address. The A register now contains the address of a cell in memory 10 coupled to memory controller 18. The QNST signal is applied to gates 91 to transfer the binary signals stored in the R register to the T register. T register 92 now contains the address of the cell of memory 10 containing the DCW currently being retrieved. The QNST signal is also applied to the S input of the LAS FF to set the LAS FF into its binary 1 state. Following a predetermined delay time, memory controller 18 applies a second QDA signal on line 90 which indicates that DCW2 is now present on N bus 74. The QDA signal is applied to gate 146 in conjunction with the J05 signal and binary 1 output of the LAS FF to enable gate 146, thereby providing an output binary 1 signal designated QNFL on line 148. The J05 signal and binary 1 output signal from LAS FF enable interrupt control matrix 110 of FIG. 7 to provide a QINT pulse to memory controller 18 by means of line 82 to provide for the next main memory access on control bus 85. A request for main memory access is thus provided in advance of the next main memory transaction.

The QNFL signal on line 148 provides for transfer of portions of DCW2 into extended memory controller 16 when applied to inputs of gates 104 and 150, FIG. 6. OR-gate 104 is enabled by either a QCON signal or QNFL signal, to, in turn, enable gates 106 to transfer the signals of DCW2 which are applied to gates 106 from N bus 74 such that DCW2 bits 0–17 are transferred into the R register. The QNFL signal on line 148 also enables gates 150 to transfer DCW2 bits 18–22 into F register 152, switches the LAS flip-flop to its binary 0 state and is applied to main memory control matrix 112 in conjunction with a QDA signal to preset J counter 114 to a state of J03. The F register now contains a five bit binary code designating a particular type of operation to be controlled by the extended memory controller. F decoder 154 responds to the binary configuration in the F register to provide an output signal designating an idle, read, or write operation as previously described. With J counter 114 in a J03 state, a pointer storage operation requiring a main memory access is performed.

Now with reference to FIG. 7 and the retrieve data control word cycle timing diagram of FIG. 10, the J03 signal applied to encoder 122 provides for a command code consisting of a 10100 binary signal combination at the output of encoder 122 on lines designated CP, CA, CB, CC and CD, respectively. This binary configuration corresponds to a CWR,SP command which is applied by means of the five command code lines 80 through control bus 85 to memory controller 18. The T register contains binary signals termed the "pointer," representing the address of the cell of memory 10 containing the DCW currently stored in extended memory controller 16 as previously described. The J03 signal is applied in conjunction with the output signals of T register 92 to the input of gates 93 which are enabled to apply the binary signals of T register 92 to lines 0–17 of U bus 86 for applying to memory controller 18. The J03 signal is also applied in conjunction with the base address signals on cable 98 to the input of gates 95 which are enabled to connect the 18 base address binary bits to pointer address lines $A_0$–$A_{17}$ and apply a binary 1 signal to pointer address line $A_{18}$. Binary 0 signals are always applied from gates 95 to address lines corresponding to bits 19–23 of lines 76. A binary address value equal to the base address plus 32 is therefore applied by means of cable 76 through control bus 85 to memory controller 18. With reference to the CWR,SP main memory timing signal waveforms, the data, command, and address signals are now applied to memory controller 18 which responds to the QINT signal applied as previously described to provide a cycle started $ST signal internally to controller 18 for initiating the storage of the pointer in the addressed cell of memory 10. During the memory controller storage access cycle, a QPIN signal is transmitted over line 84 to interrupt control matrix 110 as illustrated in FIG. 7. The QPIN signal is utilized by the extended memory controller during the write operation which is to be described hereinafter. At the completion of the CWR,SP memory cycle, a QDA signal is transmitted to extended memory controller 16 on line 78. The QDA signal is utilized in conjunction with the J03 signal from the K and J counter decoder 118 of FIG. 7 to advance controller 16 into a control state for controlling the execution of the operation represented by the decoded output of the F register.

To illustrate the sequence of action by the extended memory controller during execution of a data control word including a function code representing a read operation, Table I is provided. If the F register contains a binary configuration of 11000, F register decoder 154 provides the RDY signal which is applied to main memory control 44 and data transfer control matrix 156. The RDY signal is also applied to OR-gate 155 to provide an RDI signal, which represents a read or idle operation, to control 44 and synchronization control 48.

TABLE I.—DATA CONTROL WORD—READ OPERATION

F Register Contents=11000 (RDY)

| | Q Counter State | J and K Counter States | Control Signals | Action |
|---|---|---|---|---|
| | Q00 | J03, K00 | QDA·RDI | Preset J and K Counters=J00 and K00 Reset FFY and FFZ flip-flops to binary 0 state. |
| | Q00 | J00, K00 | RDI·DRS | Enable address comparator. Enable time signal distributor to generate $P_0$–$P_8$ signals in response to the QCLM clock signals. Increment Q counter=Q01. |
| | Q01 | J00, K00 | $DRA\cdot QCLM\cdot \overline{P_8}$ | Compare sector address of S register with address from extended memory. |
| | Q01 | J00, K00 | $P_8\cdot RDI$ | Check for address comparison. If comparison is achieved increment Q counter=Q02. |
| | Q02 | J00, K00 | $P_8\cdot RDI$ | Increment Q counter=Q03. |
| 199 | Q03 | J00, K00 | QCLM | Shift data from tracks into shift registers. |
| 199 | Q03 | J00, K00 | $P_8\cdot RDI$ | Increment Q counter=Q04. Parallel transfer of contents of shift registers to holding registers. |
| 199 | Q03 | J00, K00 | $P_8\cdot RDY$ | Preset J and K counters=J02 and K02. Set FFY and FFZ flip-flops to binary 1 state generate and apply QINT signal to memory controller. Generate and apply CWR, DP (10101). Signals to command lines for transmittal to memory controller. Transfer A register outgut signals to address lines 0–17. |
| 199 | Q04 | J02, K02 | RDY | Transfer 1st holding register output signals to U bus. |
| 199 | Q04 | J02, K02 | QDA·RDY | Decrement J counter =J01. Transmit a QDPY signal to memory controller. |
| 199 | Q04 | J01, K02 | RDY | Transfer 2nd holding register output signals to U bus. Apply a binary "1" to address line 16. |
| 199 | Q04 | J01, K02 | RDY·QPIN | Generate and apply QINT signal to memory controller. |
| 199 | Q04 | J01, K02 | RDY·QDA | Decrement J counter =J00. Reset FFY flip-flop to binary 0 state. |
| 199 | Q04 | J00, K02 | RDY | Transfer 3rd holding register output signals to U bus. |
| 199 | Q04 | J00, K02 | RDY·QDA | Decrement K counter =K01. Transmit a QDPY signal to memory controller. |
| 199 | Q04 | J00, K01 | RDY | Transfer 4th holding register output signals to U bus. |
| 199 | Q04 | J00, K01 | QDA·YRDY | Decrement K counter =K00. Reset FFZ flip-flop to a binary 0 state. |
| 199 | Q04 | J00, K00 | $\overline{FFY}\cdot\overline{FFZ}$ | Generate a QACT signal. |
| 199 | Q04 | J00, K00 | QACT | Add 4 to A register. |

TABLE I.—Continued

| | Q Counter State | J and K Counter States | Control Signals | Action |
|---|---|---|---|---|
| 199 | Q04 | J00, K00 | $P_8 \cdot RDY$ | Parallel transfer of signals from shift registers to holding registers. Preset J and K counters =J02 and K02. Set FFY and FFZ flip-flops to binary 1 state. Generate and apply QINT signal to memory controller. Transfer A register output signals to address lines 0–17. |
| 199 | Q04 | J02, K02 | RDY | Transfer 1st holding register output signals to U bus. |
| 199 | Q04 | J02, K02 | QDA·RDY | Decrement J counter =J01. Transmit a QDPY signal to memory controller. |
| 199 | Q04 | J01, K02 | RDY | Transfer 2nd holding register output signals to U bus. Apply a binary "1" to address line 16. |
| 199 | Q04 | J01, K02 | QPIN·RDY | Generate and apply QINT signal to memory controller. |
| 199 | Q04 | J01, K02 | QDA·RDY | Decrement J counter =J00. Reset FFY flip-flop to binary 0 state. |
| 199 | Q04 | J00, K02 | RDY | Transfer 3rd holding register output signals to U bus. |
| 199 | Q04 | J00, K02 | QDA·RDY | Decrement K counter =K01. Transmit a QDPY signal to memory controller. |
| 199 | Q04 | J00, K01 | RDY | Tranfer 4th holding register output signals to U bus. |
| 199 | Q04 | J00, K01 | QDA·RDY | Decrement K counter=K00. Reset FFZ flip-flop to binary 0 state. |
| 199 | Q04 | J00, K00 | $\overline{FFY} \cdot \overline{FFZ}$ | Generate a QACT signal. |
| 199 | Q04 | J00, K00 | QACT | Add 4 to A register. |
| Perform sequentially the actions of Q04, J00, K00 $P_8 \cdot RDY$ through Q04 J00, K00 QACT repeatedly for 14 times transferring 4–36 bit words each repeated operation. | | | | |
| 199 | Q04 | J00, K00 | $RDI \cdot P_8 \cdot DAD$ | Increment Q counter=Q05. Parallel transfer output signals of shift registers to holding registers. Preset J and K counters=J02 and K02. Set FFY and FFZ flip-flops to binary 1 state. Generate and apply QINT signal to memory controller. Transfer A register output signals to address lines 0–17. |
| | Q05 | J02, K02 | RDY | Transfer 1st holding register output signals to U bus. |
| | Q05 | J02, K02 | QDA·RDY | Decrement J counter=J01. Transmit a QDPY signal to memory controller. |
| | Q05 | J01, K02 | RDY | Transfer 2nd holding register output signals to U bus. Apply a binary "1" to address line 16. |
| | Q05 | J01, K02 | QPIN·RDY | Generate and apply QINT signal to memory controller. |
| | Q05 | J01, K02 | QDA·RDY | Decrement J counter=J00. Reset FFY flip-flop to binary 0 state. |
| | Q05 | J00, K02 | $P_2 \cdot RDY$ | Preset Q counter=Q00. |
| | Q00 | J00, K02 | RDY | Transfer 3rd holding register output signals to U bus. |
| | Q00 | J00, K02 | QDA·RDY | Decrement K counter=K01. Transmit a QDPY signal to memory controller. |
| | Q00 | J00, K01 | RDY | Transfer 4th holding register output signals to U bus. |
| | Q00 | J00, K01 | QDA·RDY | Decrement K counter=K00. Reset FFZ flip-flop to binary 0 state. |
| | Q00 | J00, K00 | $\overline{FFY} \cdot \overline{FFZ}$ | Generate a QACT signal. |
| | Q00 | J00, K00 | QACT | Preset J counter=J05. Generate and apply QINT signal to memory controller. |
| | Q00 | J05, K00 | | Go to retrieve data control word cycle. |

With the J counter, FIG. 7, in a state of J03 prior to the previously described pointer storage operation, the QDA pulse which is received from memory controller 18 as a result of the pointer storage access is conjunctively combined with J03, and RDI signals by control matrix 112 to provide an output signal for presetting the J and K counters to a state of J00 and K00, respectively. The J03, RDI, and QDA signals are also applied to address count control matrix 158 which, in turn, provides signals for switching flip-flops FFY 160 and FFZ 162 to their binary 0 states. Since the Q counter of synchronization control 48 has previously been set to a state of Q00 during the previously described retrieve data control word cycle, the Q00 signal and next sector signal occurring in the DRS signal, FIG. 9, conjunctively enable the time signal distributor of synchronization control 48 to start providing $P_0$–$P_8$ timing signals throughout the extended memory controller in synchronization with binary 1 signals of the QCLM clock waveform. At the same time the Q counter of synchronization control 48 is advanced to a count of Q01. With the Q counter in a state of Q01, the sector address portion of the S register is compared by the comparator of the synchronization control 48 with the binary configuration comprising the address occurring in the DRA signal.

The comparator of synchronization control 48 serially compares S register bits 11–17 with the address appearing on the DRA signal of FIG. 8 bit-by-bit during each $P_0$–$P_7$ timing signal, and at $P_8$ time provides a test for comparison by one of the techniques well-known in the art. If the addresses are equal, synchronization control 48 increments the Q counter to a state of Q02. If the addresses are not equal, the Q counter is decremented to the Q00 state to await the presence of the next sector signal to increment the Q counter to a Q01 state and provide another comparison. The Q02 state, following location of the sector, allows a nine-timing signal rest period. The next $P_8$ signal from the timing signal distributor in conjunction with a Q02 signal provides a signal for incrementing the Q counter to a Q03 state. Synchronization control 48 responds to the Q counter in a Q03 state to provide a Q34 signal which is applied to AND-gate 170, FIG. 6. The Q34 signal, the QCLM signal from extended memory 36, and a binary 1 signal from inverter 169 are applied conjunctively to enable AND-gate 170. With AND-gate 170 enabled, shift signals corresponding to each binary 1 signal of the QCLM signal are applied on line 171, identified as QESR shift signals to each of the 16 nine-bit character shift registers 64. The shift signals are applied to the 16 nine-bit character shift registers 64 such that at the $P_0$ signal time the first data bit will be shifted from each of the 16 read amplifiers 66, as received from the 16 tracks selected by track address selection matrix 50, into the first stage of each of the 16 nine-bit character shift registers 64. Shift signals will continue to be applied during a read operation throughout the duration of a Q34 signal with each shift signal occurring in response to a corresponding binary 1 signal of the QCLM waveshape of FIG. 9. At a Q counter state of Q03 and the occurrence of the $P_8$, J00, K00, and an RDY signal, the Q counter of synchronization control 48 is incremented to a state of Q04. Every $P_8$ signal provided by control 48 hereinafter during a Q counter state of Q04 will indicate that nine shift pulses have been applied to each of the 16 nine-bit character shift registers and that a nine-bit character is present in each of the shift registers.

The $P_8$ signal is also applied to data transfer control matrix 156 in conjunction with the Q34 signal to provide the QECT output signal, FIG. 5, to transfer gates 172. A set of 144 gates within transfer gates 172 respond to the QECT signal to provide for a parallel transfer of the contents of the 16 nine-bit character shift registers 64 to four 36 bit word holding registers 174. Q34, $P_8$ and RDY signals are applied in a similar manner to main control matrix 112 which responds to provide output signals to both the K and J counters for setting their respective states to K02 and J02. The Q34, $P_8$ and RDY signals are also applied to address count control matrix 158 of FIG. 7 for providing signals for switching flip-flops FFY 160 and FFZ 162 to the binary 1 state. Q34, $P_8$ and RDY signals also enable interrupt control matrix 110 to generate a QINT signal which is transmitted by means of line 82 through control bus 85 to memory controller 18. The K and J decoder 118 outputs J21 and K21 are applied in conjunction with the RDY signal from F decoder 154 to encoder 122 to provide the binary coded command signal 10101 corresponding to a DWR,DP command on lines 80 through control bus 85 to memory controller 18. The J21 and K21 signals are also applied by means of lines 120 to enable OR-gate 173, thereby providing a binary 1 signal to gates 174 to provide for transferring signals from A register 144 to address lines 76 through control bus 85 to memory controller 18. Binary 0 signals are always applied from gates 144 to address lines corresponding to bits 22 and 23 of lines 76. The J02, K02, Q04 and RDY signals are now applied to transfer control matrix 156 to generate and provide a QCOU signal on lines 1179 to data output gates 41, which include a set of 36 gates responsive to the QCOU signal to transfer signals of a first holding register through U bus 86 for applying to controller 18. The waveforms of FIG. 8 illustrate that controller 18 responds to the QINT pulse on line 82 to provide a cycle started signal $TS internally to the memory controller for initiating a main memory access operation.

Following the cycle started condition within memory controller 18, the command and address lines are sampled and a QPIN signal is transmitted from the memory controller 18 to extended memory controller 16 on line 84 of the control bus to indicate that the command and address lines have been sampled and that the command and address signals may now be removed. The memory controller next samples the signals present on the 36 lines of U bus 74 and provides for storing the first word of the four 36 bit word holding registers 174 in the memory location specified by the address. Since the memory controller can accept only 36 data lines at a time, extended memory controller 18 must transfer the four 36 bit words in holding registers 174 one word at a time and provide control for two successive CWR,DP cycles of memory.

The read operation continues in accordance with the sequence of operation illustrated in Table I.

While four words in holding registers 174 are being stored in memory 16 by memory controller 18, the sixteen 9 bit character shift registers 64, FIG. 5, have been receiving shift signals. The shift signals provided through enabled gate 170 as illustrated in FIG. 6 correspond to each binary 1 signal supplied by the QCLM signal. As illustrated by line 199 in Table I, the shift signals are provided during the time interval that the Q counter remains in its Q03 or Q04 state for a read operation. Therefore, following every nine successive shift signals, the next sixteen 9 bit characters to be transferred to holding registers 174 are present in shift registers 64. At each $P_8$ time during Q03 or Q04 state of the Q counter, data transfer control matrix 156 is controlled to provide a signal for enabling transfer gates 172 to provide a parallel transfer of signals representing the contents of sixteen 9 bit character shift registers 64 to the four 36 bit holding registers 174. Each $P_8$ signal occurring during the Q04 state of the Q counter sets the J and K counters to the J02 and K02 states, respectively, to provide J21 and K21 signals for the transfer of four words to main memory. The J21 and K21 signals in conjunction with the RDY signal initiates a CWR,DP memory cycle for storing the first two words in holding registers 174, which is followed by a second CWR,DP memory cycle for storing the next two 36 bit words contained in holding registers 174.

This process continues such that for each $P_8$ timing signal or every nine shift signals, four 36 bit words are transferred in parallel from the shift registers to the holding registers and stored within memory 10. Following each four word storage cycle, the A register count is incremented by 1 to provide a corresponding increase of 4 in the numerical value of the address signals applied to address lines $A_0$–$A_{23}$. The incremented addresses are representative of memory cells with consecutive addresses for storage of a block of data words, such as, for example, a block of 64 data words in memory 10. As previously described, 64 data words are contained within each sector of information transferred from extended memory to main memory.

The shifting of bits into the shift registers and parallel transfer of sixteen characters to four 36 bit holding registers 174 continues until the end of sector signal designated as end sector-end read on waveform DRA occurs as illustrated in FIG. 9. With the Q counter in a state of Q04 and a $P_8$ signal present in conjunction with the end sector-end read (DAD) signal, the Q counter of synchronization control 48 in FIG. 5 is incremented to a state of Q05. At the time when the end sector-end read (DAD) signal occurs at a Q04 and $P_8$ time, the last 16 nine bit characters of an addressed sector have been shifted into shift registers 64. An additional parallel transfer from the shift registers to the holding registers is, therefore, required and two additional CWR,DP memory cycles must be provided by memory controller 18. The Q05 signal in conjunction with a $P_2$ timing signal provides for presetting the Q counter to a state of Q00, thereby providing a Q00 signal.

After the transfer and storage of four additional 36 bit words, a QACT signal is generated as a result of resetting flip-flop FFY 160 following transfer of the first two words and flip-flop FFZ 162 following transfer of the second two words. The QACT signal is utilized in conjunction with the Q00 state of the Q counter to enable main control matrix 112 to preset the J counter to a state of J05. K and J decoder 118 then provides a J05 binary "1" output signal. The J05 signal is then applied to interrupt control matrix 110 to enable the interrupt control matrix to provide a QINT pulse on line 182 to memory controller 18. With the J counter in a J05 state, the extended memory controller is in an operating condition for controlling the retrieval of a data control word pair from main memory.

As illustrated by the waveform designated as read data in FIG. 9, data words are read from extended memory 12 during the time interval between the conjunctive occurrence of the $P_8$ and Q03 signals and the conjunctive occurrence of the $P_8$, Q04 and end sector-end read (DAD) signals for a read operation. The end sector-end read (DAD) signal of the DRA waveform of FIG. 9 represents the completion time for reading data from extended memory 12. During the Q05 state of the Q counter and $P_0$, $P_1$, and $P_2$ timing signals times, three parity bits are read from extended memory and checked in a manner well-known in the art and not material to this invention.

Following the presetting of J counter 114 to a J05 state, and applying a QINT signal to memory controller 18, the retrieve data control word cycle of operation is performed including the pointer storage operation as previously described and as illustrated by the timing diagram of FIG. 10.

The retrieve data control word cycle of operation is performed utilizing the DCW relative address stored in R register 96, FIG. 5, and which was provided by a previous DCW pair.

To illustrate the sequence of action by the extended memory controller during execution of a data control word, including a function code representing a write operation, Table II is provided. If a binary configuration of 11010 is present in F register 152, and the A, T, R and S registers store data corresponding to addresses received as a result of retrieving a DCW, control of execution of a write operation is provided. The output of F decoder 154 provides the WRY signal which is applied to main control matrix 112 in conjunction with JO3 and K00 signals from K and J decoder 118, a Q00 signal from synchronization control 48, and the QDA pulse received as a result of the pointer storage operation requiring a main memory access in response to a J counter state of J03. As previously described, following each retrieval of a DCW pair the extended memory controller performs the pointer storage operation, and the J counter asumes a J03 state before controlling the operation specified by the F register contents.

TABLE II.—DATA CONTROL WORD—WRITE OPERATION

F Register Contents=11010 (WRY)

| | Q Counter State | J and K Counter States | Control Signals | Action |
|---|---|---|---|---|
| | Q00 | J03, K00 | QDA·WRY | Preset J and K counters=J02 and K02. Set FFY and FFZ flip-flops to binary 1 state. Generate and apply a QINT signal to memory controller. |
| | Q00 | J02, K02 | WRY | Generate and apply RRS,DP (10001) signals to command lines for transmittal to memory controller. Transfer A register output signals to address lines 0-17. |
| | Q00 | J02, K02 | QPIN | Generate and apply a QINT signal to memory controller. |
| | Q00 | J02, K02 | QDA·WRY | Transfer signals on N bus lines 0–36 to 1st holding register decrement J counter=J01. |
| | Q00 | J01, K02 | | Apply a binary "1" to adress line 16. |
| | Q00 | J01, K02 | QDA | Transfer signals on N bus lines 0–36 to 2nd holding register decrement J counter=J00. Reset FFY flip-flop to binary 0 state. |
| | Q00 | J00, K02 | QDA | Transfer signals on N bus lines 0-36 to 3rd holding register decrement K counter=K01. |
| | Q00 | J00, K01 | QDA | Transfer signals on N bus lines 0-36 to 4th holding register decrement K counter=K00. Reset FFZ flip-flop to binary 0 state. |
| | Q00 | J00, K00 | $\overline{FFY}\cdot\overline{FFZ}$ | Generate a QACT signal. |
| | Q00 | J00, K00 | QACT | Add 4 to A register. |
| | Q00 | J00, K00 | DRS | Enable address comparator. Enable time signal distributor to generate $P_0$–$P_8$ signals in response to the QCLM clock signal. Increment Q counter=Q01. |
| | Q01 | J00, K00 | DRA·QCLM·$\overline{P_8}$ | Compare sector address of S register serially with address from extended memory. |
| | Q01 | J00, K00 | $P_8$ | Check for address comparison—if comparison is achieved increment Q counter=Q02. |
| | Q02 | J00, K00 | $P_6$·WRY | Increment Q counter=Q03. Parallel transfer of holding register output signals to shift registers. Preset J and K counters=J02 and K02. Set write flip-flop (enable write amplifiers) to binary 1 state. Set FFY and FFZ flip-flops to binary 1 state. Generate and apply QINT signal to memory controller. |
| | Q03 | J02, K02 | WRY | Transfer A register output signals to address lines 0–17. Generate and apply RRS, DP (10001) signals to command lines for transmittal to memory controller. |
| 200 | Q03 | J02, K02 | QCLM·$\overline{P_8}$ | Shift data from shift registers to data tracks. |
| 200 | Q03 | J02, K02 | QPIN | Generate and apply a QINT signal to memory controller. |
| 200 | Q03 | J02, K02 | QDA | Transfer signals on N bus lines 0–36 to 1st holding register decrement J counter=J01. |
| 200 | Q03 | J01, K02 | | Apply a binary "1" to address line 16. |
| 200 | Q03 | J01, K02 | QDA | Transfer signals on N bus lines 0–36 to 2nd holding register decrement J counter=J00. Reset FFY flip-flop to binary 0 state. |
| 200 | Q03 | J00, K02 | QDA | Transfer signals on N bus lines 0-36 to 3rd holding register decrement K counter=K01. |
| 200 | Q03 | J00, K01 | QDA | Transfer signals on N bus lines 0-36 to 4th holding register decrement K counter=K00. Reset FFZ flip-flop to binary 0 state. |
| 200 | Q03 | J00, K00 | $\overline{FFY}\cdot\overline{FFZ}$ | Generate a QACT signal. |
| 200 | Q03 | J00, K00 | QACT | Add 4 to A register. |
| 200 | Q03 | J00, K00 | $P_6$·WRY | Increment Q counter=Q04. Parallel transfer of holding register output signals to shift registers. Preset J and K counters=J02 and K02. Set FFY and FFZ flip-flops to binary 1 state. Generate and apply QINT signal to memory controller. |
| 200 | Q04 | J02, K02 | WRY | Transfer A register output signals to address lines 0–17. Generate and apply RRS,DP (10001) signals to command lines for transmittal to memory controller. |
| 200 | Q04 | J02, K02 | QPIN | Generate and apply a QINT signal to memory controller. |
| 200 | Q04 | J02, K02 | QDA | Transfer signals on N bus lines 0-36 to 1st holding register decrement J counter=J01. |
| 200 | Q04 | J01, K02 | WRY | Apply a binary "1" to address line 16. |
| 200 | Q04 | J01, K02 | QDA | Transfer signals on N bus lines 0–36 to 2nd holding register decrement J counter=J00. Reset FFY flip-flop to binary 0 state. |
| 200 | Q04 | J00, K02 | QDA | Transfer signals on N bus lines 0–36 to 3rd holding register decrement K counter=K01. |
| | Q04 | J00, K01 | QDA | Transfer signals on N bus lines 0–36 to 4th holding register decrement K counter=K00. Reset FFZ flip-flop to binary 0 state. |
| 200 | Q04 | J00, K00 | $\overline{FFY}\cdot\overline{FFZ}$ | Generate a QACT signal. |
| 200 | Q04 | J00, K00 | QACT | Add 4 to A register. |
| 200 | Q04 | J00, K00 | $P_6$·WRY | Parallel transfer of holding register output signals to shift registers. Preset J and K counters=J02 and K02. Set FFY and FFZ flip-flops to binary 1 state. Generate and apply QINT signal to memory controller. |
| Perform sequentially the actions of Q04 J02, K02 WRY through Q04 J00, K00 $P_6$·WRY repeatedly for 12 times and the actions of Q04 J02, K02 WRY through Q04 J00, K00 QACT for a 13th time. | | | | |
| 200 | Q04 | J00, K00 | $P_6$·DAD | Increment Q counter=Q05. |
| | Q05 | J00, K00 | $P_0$·WRY | Preset Q counter=Q00. Reset write flip-flop to binary 0 state. Preset J counter=J05. Generate and apply a QINT signal to memory controller. |
| | Q00 | J05, K00 | ------------------- | Go to retrieve data control word cycle. |

The WRY, J03 and QDA signals are also applied to address count control matrix 158, FIG. 7, to generate signals for setting flip-flops FFY 160 and FFZ 162 to their binary 1 states. The J03, WRY and QDA signals in a similar manner are applied to interrupt control matrix 110 of FIG. 7 to generate a QINT pulse for applying on line 82 through control bus 85 to memory controller 18 to request a main memory access. The combined J03, QDA and WRY signals enable main control matrix 112 to provide a signal for presetting the J and K counters to their respective J02 and K02 states. With the J and K counters respectively preset to states J02 and K02, K and J decoder 118 provides binary 1 output signals designated as K21 and J21 which are applied to encoder 122. In response to the J21 or K21 signals and a WRY signal, encoder 122 generates five signals which are applied to lines 80 to provide a binary coded signal combination of 10001 representing an RRS,DP command to memory controller 18. J21 and K21 signals are also applied by means of lines 120 to enable OR-gate 173, FIG. 6, to provide a binary 1 signal for enabling gates 174 during the presence of a J21 or K21 binary 1 signal. Enabled gates 174 provide for transferring signals from A register 144, representing the main memory address, to address lines 76 through control bus 85 to memory controller 18.

With reference to the waveforms illustrated in FIG. 7 for a RRS,DP command, it is seen that following the transmittal of the QINT signal a cycle started signal designated as $TS is generated internally to the memory controller. After memory controller 30 has utilized the command and address signals to initiate a storage operation by one of memories 22 or 23, a QPIN signal is transmitted to extended memory controller 18. The J02, K02 and QPIN signals are applied to interrupt control matrix 110 to generate a QINT signal for applying by means of line 82 through control bus 85 to memory controller 30 for requesting a second successive double precision memory cycle. When the memory controller has retrieved from one of memories 22 or 23, two words corresponding to the first two data words to be transferred and written in extended memory 36, a QDA signal is applied by means of line 78 to the extended memory controller 18. The QDA signal signifies that signals representing the first data word retrieved have been applied to N bus 74 lines 0–35 for transfer into a first register of holding registers 174. With J02, WRY and QDA signals applied to transfer control matrix 156, a QNC0 signal is applied by means of lines 186 to data input gates 40. The QNC0 signal applied to data input gates 40 enables a set of 36 gates to provide for transferring signals representing a 36-bit data word from N bus 74 to the first register of holding registers 174. The WRY, J02 and QDA signals are also applied to main control matrix 112 which generates a signal for decrementing the J counter to a J01 state. A J01 binary 1 signal is provided from the output of K & J decoder 118 along with a K02 binary 1 signal for applying to gate 182, FIG. 5, to enable gate 182 to provide a binary 1 output signal on address line $A_{22}$ to increment the address by a count of 2 for utilization by the memory controller during the second double precision memory cycle.

Memory controller 30 automatically provides a second QDA signal to extended memory controller 18 on line 90 of control bus 85, when signals representing the second word are present on N bus 74 lines O–35. The J01 signal from the output of the J and K decoder 118 and WRY signal are applied to data transfer control matrix 156 with the QDA signal received by means of line 90. Data transfer control matrix 156 generates a QNC5 signal which is applied by means of lines 186 to data input gates 40. A set of gates within data input gates 40 responds to the QNC5 signal to transfer signals, corresponding to the second 36 bit data word, from N bus 74 to a second of holding registers 174. The J01 and QDA signals are also applied to main control matrix 112 which generates a signal for decrementing J counter 114 to a state of J00. The J01 and QDA signals are applied to address count control matrix 158 to reset flip-flop FFY 160 to its binary 0 state. As previously described, the J02 and QPIN signals enable interrupt control matrix 110 to provide a QINT signal to memory controller 30 for requesting a second memory cycle. Memory controller 30 automatically responds to the second QINT signal to grant a second successive RRS,DP memory cycle utilizing command signals from encoder 122 applied to cable 80 and the address signals provided on address lines 76 of control bus 85.

Following decrementing the J counter to its J00 state and with the K counter in a K02 state, a QDA signal is received by means of line 90 through control bus 85 from memory controller 30. The QPA signal signifies that signals representing the third 36 bit word retrieved from main memory are now present on lines 0–35 of N bus 74. The K02 and J00 signals corresponding to K and J counter states of K02 and J00 are applied in conjunction with the QDA signal to data transfer control matrix 156 which provides a QPD0 signal on lines 186 applied to data input gates 40. The QPD0 signal enables a set of 36 gates within data input gates 40 to transfer signals representing the third 36 bit word from N bus 74 to a third one of holding registers 174. K02 and J00 signals in conjunction with the QDA signal are also applied to main memory controller matrix 112 for decrementing K counter 115 to a state of K01. With a K counter state of K01 and J counter state of J00, the next QDA pulse received from the memory controller signifies that signals representing the fourth 36 bit word retrieved from main memory are present on lines of N bus 74. The K01 and QDA signals are applied to data transfer control matrix 156 for generating a QPD5 signal on lines 185 to data input gates 40. The QDP5 signal enables a set of 36 gates within data input gates 40 to provide for transfer of the signals representing the fourth 36 bit word from N bus 74 to the fourth register of holding registers 174. The K01 and QDA signals are also applied to main control matrix 112 for decrementing the K counter equal to a K00 state and are in a similar manner applied to address count control matrix 158 for resetting flip-flop FFZ 162 to its binary 0 state. With flip-flops FFY 160 and FZ 162 both in their binary 0 states, their binary 0 output signals are applied to AND-gate 184 which provides a QACT signal. The resulting QACT signal is applied to the A register flip-flop corresponding to the address bit represented by the signal applied to line $A_{21}$ for incrementing the data address contained in A register 144 by a count of 1, which automatically increases the representative address signals present on address lines 76 by a count of 4.

Synchronization control 48 has been initialized for operation previously during the data control word retrieval operation by presetting the Q counter to a state of Q00. With a Q counter state of Q00 and J counter state of J00 and K counter state of K00 states, the next sector signal appearing on waveform DRS illustrated in FIG. 8 provides a signal for incrementing the Q counter to a state of Q01. The sector signal also enables a time pulse distributor (not shown) with extended memory control 48 to provide nine timing signals $P_0$–$P_8$ in synchronism with the QCLM signal from extended memory to logic throughout extended memory controller 18. With the Q counter state of Q01, the sector address provided by the binary address signals illustrated by the DRA waveform in FIG. 8 are compared with the sector address from the S register. At a state of Q01 and the time of occurrence of $P_8$ timing signal, address comparison is checked in a suitable manner well-known in the art to determine if address comparison is achieved. If the addresses are equal, the Q counter is incremented to a state of Q02. If the addresses are not equal, the Q counter is preset to a state of Q00 and another comparison made following the next sector mark signal. With a WRY signal present, the Q counter at Q02 state, the time pulse distributor providing an output signal $P_6$, the Q counter is incremented to a state of Q03. The WRY, Q02 and $P_6$ signals also applied to the data transfer control matrix 156 which generates a signal designated as QCET as illustrated in FIG. 3. The QCET signal is applied to a set of 144 gates within transfer gates 172 to provide for parallel transfer of signals representing the four 36 bit words in holding registers 174 to shift registers 64. The signals Q02 and $P_6$ are applied in a similar manner to main control matrix 112 to generate signals for presetting the K and J counters to states of K02 and J02 respectively. Signals Q02, $P_6$ and WRY are applied to gate 188 to set write flip-flop 190 to its binary 1 state. The Q02, WRY and $P_6$ signals are also applied to address count control matrix 158 which provides signals to set flip-flops FFY 160 and FFZ 162, as illustrated in FIG. 6, to their binary 1 states. The Q02, $P_6$ and WRY signals are in a similar manner applied to interrupt control matrix 110 to generate a QINT signal which is applied by means of line 82 through control bus 85 to memory controller 30.

Synchronization control 48 provides a Q34 binary 1 output signal when the Q counter is in the Q03 or Q04 states. The Q34 signal and each successive binary 1 signal appearing on the QCLM waveform illustrated in FIG. 8 are applied to inputs of AND-gate 170 illustrated in FIG. 5 to provide binary 1 output signals corresponding to each binary 1 signal of the QCLM waveform for a write operation. The binary 1 output signals are shift signals provided during Q counter states of Q03, Q04 and P signal times (except during the $P_6$ timing signal time when gate 192 is inhibited). The shift signals are provided during the time interval indicated by line 200 of Table II. During a write operation each binary 1 QCLM clock signal except the signal corresponding to the $P_6$ timing signal is provided as the shift signals previously described at the output of AND-gate 170 and applied by means of line 171, identified as QESR, to each of sixteen 9 bit character shift registers 64 to serially shift each bit in each of the nine bit shift registers to write amplifiers 68.

Write amplifiers 68 are in an enabled state due to the presence of a write enable signal on line 195 resulting from the write flip-flop 190 being set to its binary 1 state, as previously described in response to Q02 and $P_6$ signals. Therefore, bits shifted into the least significant bit position of each of sixteen 9 bit shift registers 64 are written serially in a corresponding one of 16 tracks.

The write operation continues in accordance with the sequence of operations illustrated in Table II.

The Q counter states of Q03 and Q04 in conjunction with the $P_6$ timing signal provide control of both memory controller 18 and access control 22 until the end sector-end write (DAD) signal is received by means of the DRA signal. The end sector-end write (DAD) signal represents the completion time for writing data into extended memory 26. Upon receiving a $P_6$ timing signal coinciding with the time of occurrence of the end sector-end write (DAD) signal, the Q counter is incremented to a state of Q05. During the Q05 state, the WRY, QO and $P_0$ signals applied to gate 194 as illustrated in FIG. 6 reset write flip-flop 190 to its binary 0 state, thereby providing a binary 0 signal on output line 195 to disable write amplifiers 68 from further writing.

The write data waveform of FIG. 9 illustrates that data is written into extended memory during the time between $P_0$ time of the Q counter Q02 state and $P_6$ time of the Q counter Q04 state coinciding with the end sector signal. The Q counter state of Q05 provides for writing three parity bits in a manner which is not material to this invention. The Q05 signal resulting from a Q counter state of Q05 and $P_0$ timing signal are also applied to main control matrix 112 which provides a signal for presetting the J counter to a state of J05 for initiating a retrieve data control word cycle of operation as previously described.

To illustrate the sequence of action by the extended memory controller during execution of a control word including a function code representing an idle operation, Table III is provided. With the F register containing a binary configuration of 01010, F register decoder 154 illustrated in FIG. 6 provides the idle signal which is applied to OR-gate 155 to provide an output signal designated RDI which represents a read or idle operation. The RDI signal is applied to main memory control 44 and synchronization control 48.

relative address which is stored in R register 96, as illustrated in FIG. 6, as a result of retrieving a previous DCW. Therefore, each DCW supplies a representation of a pointer address to be used for retrieving the next DCW from a string of DCW's following completion of controlling the execution of a current DCW.

DCW's are retrieved from memory 10 before each corresponding sector is accessible between the time of receiving the previously described end sector signals and the sector signal from access control 22. The sector signal represents the start of access to the next sector. The end sector signals, representing an ending portion of a sector, control terminating execution of the storage operations associated with the transfer or ineffective operations specified by each DCW, thereby providing a representation of the completion of execution of a DCW. The completion of execution of each DCW is then followed by the retrieval DCW, and the pointer storage operations previously described before the sector signal representing the start of the next sector is received.

As the extended memory controller controls the memory controller for successively retrieving a string of DCW's from memory 10, and controls the access control for executing the storage operations associated with DCW's during access to corresponding sectors, the processor 14 stores new DCW's which it prepares for the retrieval and control of execution by the extended memory controller. Processor 14 stores the new DCW's with consideration of the circumferential position of the circulating extended memory to provide for the storing DCW's in the order of access to corresponding

TABLE III.—DATA CONTROL WORD—IDLE OPERATION

F Register Contents=01010 (IDLE)

| Q Counter State | J and K Counter States | Control Signals | Action |
|---|---|---|---|
| Q00 | J03, K00 | QDA·RDI | Preset J and K counters=J00 and K00. Reset FFY and FFZ flip-flops to binary 0 state. |
| Q00 | J00, K00 | RDI·DRS | Enable address comparator. Enable time signal distributor to generate $P_0$–$P_8$ signals in response to the QCLM clock signals. Increment Q counter=Q01. |
| Q01 | J00, K00 | DRA·QCLM·$\overline{P_8}$·RDI | Compare sector address of S register with address from extended memory. |
| Q01 | J00, K00 | $P_8$·RDI | Check for address comparison. If comparison is achieved increment Q counter=Q02. |
| Q02 | J00, K00 | $P_8$·RDI | Increment Q counter=Q03. |
| Q03 | J00, K00 | QCLM | Shift data from tracks into shift registers. |
| Q03 | J00, K00 | $P_8$·RDY | Increment Q counter=Q04. |
| Q04 | J00, K00 | RDI·$P_8$·DAD | Increment Q counter=Q05. |
| Q05 | J00, K00 | $P_2$·RDI | Preset Q counter=Q00. Generate a QACT signal. |
| Q00 | J00, K00 | QACT | Preset J counter=J05. Generate and apply QINT signal to memory controller. |
| Q00 | J05, K00 | | Go to retrieve data control word cycle. |

Extended memory controller operation for an idle DCW is identical to the operation previously described for a read DCW with the exception that no data is transferred from the 16 shift registers to the holding registers. As illustrated in Table III, data is shifted into the 16 shift registers and a read operation is controlled by access control 22; however, no transfer of data from the shift registers is provided. With reference to FIG. 9, it is seen from the READ DATA waveform that data is read from extended memory for the same sector interval of time for both the idle and read operations. As previously described, following the read operation a retrieve data control word cycle is performed following the idle operation and the pointer stored in memory 10. With reference to Table III, when the Q counter state changes from Q05 to Q00, the Q05 signal is applied to address count control matrix 158. Address count control provides an output signal designated as Q05 which controls gate 184 to generate a QACT signal. The QACT signal is applied in conjunction with J00, K00, and Q00 signals to main control matrix 112. Main control matrix 112 responds to preset the J counter 114 to a J05 state. With the J counter at a J05 state following the idle operation, the required communication signals are provided by extended memory controller 16 to memory controller 18, which responds to retrieve the next DCW from memory 10. The address signals are provided utilizing bits representing the DCW sectors in cells of memory 10 storing a string of DCW's. In storing the new DCW's, processor 14 provides the precaution of testing the contents of each cell beforehand to determine that the cell where it is required to store a new DCW is available. These operations are performed by the processor under control of the operating system programs.

Processor 14 employs well-known programming techniques to perform under control of the operating system programs stored in memory 10 to retrieve the pointer indicium stored by extended memory controller 16 and determine the current circulation position of extended memory 12. One technique may be, by way of example, a comparison of the pointer indicium with indicium stored in a table of cells of memory 10 to determine the cell of memory 10 storing the DCW which extended memory controller 12 is currently controlling the execution of and corresponding to the currently accessible sector of extended memory 12. In this manner, the operating system determines the cells of a string of cells of memory 10 into which newly generated DCW's are to be stored in a string of DCW's according to the order of access to corresponding sectors of etxended memory 12.

DCW's stored in a string of cells of memory 10 are successively retrieved by extended memory controller 16 as each sector is accessible as previously described.

As the transfer and ineffective functions specified by each DCW are being executed, the operating system continually performs maintenance on the string of DCW's stored in memory 10. The operating system may, by way of example, interrogate the contents of any cell of memory 10 as described in Planning A Computer System, Werner Buchholz, McGraw-Hill Book Company, Inc., 1962, p. 253. During interrogation the operating system provides for testing the contents of any cell to determine whether the cell contains a DCW specifying an ineffective operation. As a result of the test, new DCW's are inhibited from being stored in the string of DCW's at cells containing DCW's specifying transfer operations which have not been executed.

The operating system may, for example, continually receive requests for transfers of information between memory 10 and extended memory 12, and generate new DCW's, each DCW corresponding to a specific sector participating in an information transfer. These new DCW's are substituted in the string of DCW's in place of DCW's specifying an ineffective operation. At all other cells storing DCW's corresponding to each sector not involved in a specified transfer operation, a DCW specifying an ineffective operation is stored. This may be provided, by way of example, by the operating system interrogating the cell containing the pointer following the execution of each DCW to determine the currently accessible sector, and storing a DCW specifying an ineffective operation at the cell containing the DCW corresponding to the immediately preceding sector which was accessible. In the case when no transfer requests are received, all DCW's in the string would specify ineffective operations. In the case when transfer requests are received, the operating system utilizes the pointer indicium to determine the currently accessible sector and to control storage of new DCW's in respective cells storing the string of DCW's in an order corresponding to the accessibility of the sector specified in each DCW.

The operating system provides for the storage of new DCW's in strings of DCW's in each of the first and second previously described embodiments in a similar manner which may be, by way of example, according to the previously described programming techniques. For the third embodiment, the operating system responds to the pointer indicium for storing new DCW's in the other one of the two sets of cells from the set supplying DCW's during a current cycle of circulation. The operating system thus responds to the pointer indicium to monitor and maintain a string of DCW's in the main memory as each sector of the circulating extended memory is accessible. Since the DCW contains a pointer address representing the cell of memory 10 storing the next DCW in a string, the pointer address may, for example, be utilized to point from the cell containing a DCW corresponding to a starting sector of a cycle of circulation. The pointer address is used in this manner in the first and second embodiments previously described to provide for cyclically executing a string of DCW's. For the third embodiment, using two strings of cells, the pointer address of the cell in each string storing a DCW corresponding to the ending sector of a cycle of circulation represents the cell of another string of cells storing the DCW corresponding to the starting sector of a cycle of circulation. In the third embodiment, the pointer address thus provides for retrieving DCW's from an alternate one of two strings of cells for each cycle of circulation of extended memory 12. The extended memory controller thus responds to the pointer address linking the end of a string of cells to the start of a string of cells to cyclically retrieve DCW's from one string of cells or switch between a plurality of strings of cells for continuing to successively retrieve and control the execution of a DCW as each sector is accessible during a cycle of circulation of the extended memory.

While the principles of the invention have been made clear in an illustrative embodiment, there will be immediately obvious to those skilled in the art many modifications in structure, arrangement, proportions, the elements, materials, and components used in the practice of the invention and otherwise which are particularly adapted for specific environments and operating requirements without departing from those principles. The appended claims are therefore intended to cover and embrace any such modifications within the limits only of the true spirit and scope of the invention.

What is claimed is:

1. A storage control system comprising: a circulating storage member having a plurality of periodically accessible sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words representing one of said storage operations; control means for receiving a control word and for responding to a control word representing a storage operation for controlling said access means to execute the operation represented by said control word; means for successively retrieving said control words from said storage means in synchronism with the time of accessibility of said sectors provided by said access means and for transferring said retrieved control words to said control means, a control word being supplied to said control means as each sector is provided access by said access means.

2. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words representing one of said storage operations; control means for receiving a control word and for responding to a control word representing a storage operation for controlling said access means to execute the operation represented by said control word; means for successively retrieving said control words from said storage means in synchronism with the time of accessibility of said sectors provided by said access means and for transferring said retrieved control words to said control means, a control word being supplied to said control means as each sector is provided access by said access means.

3. A storage control system comprising: a circulating storage member having N circumferentially disposed sectors for storing information, where N is an integer; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to M times N where M is an integer, access being provided to said set during each M cycles of circulation of said storage member, each of said cells storing a control word, each of a plurality of said control words representing one of said storage operations; control means for receiving a control word and for responding to a control word representing a storage operation for controlling said access means to execute the operation represented by said word; means for successively retrieving said control words from said storage means in synchronism with the time of accessibility of said sectors provided by said access means and for transferring said retrieved control words to said control means, a control word being supplied to said control means as each sector is provided access by said access means.

4. A storage control system comprising: a circulating storage member having N periodically accessible sectors for storing information, where N is an integer; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to M times N where M is an integer, access being provided to said set during each M cycles of circulation of said storage member, each of said cells storing a control word, each of a plurality of said control words representing one of said storage operations; control means for receiving a control word and for responding to a control word representing a storage operation for controlling said access means to execute the operation represented by said word; means for successively retrieving said control words from said storage means in synchronism with the time of accessibility of said sectors provided by said access means and for transferring said retrieved control words to said control means, a control word being supplied to said control means as each sector is provided access by said access means.

5. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words representing one of said storage operations; control means for receiving a control word and for responding to a control word representing a storage operation for controlling said access means to execute the operation represented by said control word; means for supplying a control word from said storage means to said control means as each sector is provided access by said access means.

6. A storage control system comprising: a circulating storage member having N circumferentially disposed sectors for storing information, where N is an integer; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a string of contiguously disposed storage cells, the number of cells in said string being M times N where M is an integer, access being provided to said string during each M cycles of circulation of said storage member, each of said cells storing a control word, each of a plurality of said control words representing one of said storage operations; control means for receiving a control word and for responding to a control word representing a storage operation for controlling said access means to execute the operation represented by said control word; means for successively retrieving said control words from said string of contiguously disposed storage cells in synchronism with the time of accessibility of said sectors provided by said access means and for transferring said retrived control words to said control means, a control word being supplied to said control means as each sector is provided access by said access means.

7. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words representing one of said storage operations; control means for receiving a control word and for responding to a control word representing a storage operation for controlling said access means to execute the operation represented by said control word; means for repeatedly retrieving the control word content of the cells of said set during successive cycles of circulation from said storage means in synchronism with the time of accessibility of said sectors provided by said access means and for transferring said retrieved control words to said control means, a control word being supplied to said control means as each sector is provided access by said access means.

8. A storage control system comprising: a circulating storage member having N circumferentially disposed sectors for storing information, where N is an integer, controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being M times N where M is an integer, access being provided to said set during each M cycles of circulatiton of said storage member, each of said cells storing a control word, each of a plurality of said control words representing one of said storage operations; control means for controlling the execution of a control word and being responsive to a control word representing a storage operation for controlling said access means to execute the operation represented by said control word; means for repeatedly retrieving the control word content of the cells of said set once every M cycles of circulation from said storage means in synchronism with the time of accessibility of said sectors provided by said access means and for transferring said retrieved control words to said control means, as each sector is provided access by said access means.

9. A storage control system comprising: a circulating storage member having a plurality of circumferentially disposed sectors for storing information; controllable access means coupled to said storage member for providing sequential access to all of said sectors during each cycle of circulation of said member, said access means being controllable to execute seletively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words being a first type of control word representing one of said storage operations and each of the remaining control words in said cells being a second type of control word representing an ineffective operation, each of said control words corresponding to a respective one of said sectors; control means for receiving a control word and for responding to a control word representing a storage operation for controlling said access means to execute the storage operation represented by said control word and for responding to a control word representing an ineffective operation for controlling an ineffective operation during access to a corresponding one of said sectors; means for repeatedly retrieving the control word content of the cells of said set once each cycle of circulation from said storage means in synchronism with the time of accessibility of said sectors provided by said access means and for transferring said retrieved control words to said control means, as each sector is provided access by said access means.

10. A storage control system comprising: a circulating storage member having a plurality of periodically accessible sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words being a first type of control word representing one of said storage operations and each of the remaining control words in said cells being a second type of control word representing an ineffective operation, each of said control words corresponding to a respective one of said sectors; control means for receiving a control word and for responding to a control word representing a storage operation for controlling said access means to execute the storage operation represented by said control word and for responding to a control word representing an ineffective operation for controlling an ineffective operation during access to a corresponding one of said sectors; means for repeatedly retrieving the control word content of the cells of said set once each cycle of circulation from said storage means in synchronism with the time of accessbility of said sectors provided by said access means and for transferring said retrieved control words to said control means, as each sector is provided access by said access means.

11. A storage control system comprising: a circulating storage member having a plurality of circumferentially disposed sectors for storing information; controllable access means coupled to said storage member for providing sequential access to all of said sectors during each cycle of circulation of said member, said access means being controllable to perform selectively the storage operations of entering information into and retrieving information from said sectors as access is provided thereby; a storage means comprising a string of addressable storage cells for storing control words and a set of addressable storage cells adapted to store data words, the number of cells in said string being equal to the number of said sectors for which said access is provided during a cycle of circulation of said storage member, each of the cells of said string of cells storing one of a string of control words, each of a plurality of said control words being a first type of control word representing one of said storage operations and each of the remaining control words of said string of control words being a second type of control word representing an ineffective operation, each of said control words corresponding to a respective one of said sectors and including a pointer address representing the cell storing the control word corresponding to the next accessible sector; control means for receiving a control word and for responding to a control word representing a storage operation for controlling said access means to execute the storage operation represented by said control word, responsive to a control word representing an ineffective operation to control execution of an ineffective operation during access to said respective one of said sectors and being responsive to the pointer address in each control word to store a pointer indicium in one of said set of storage cells of said storage means, said pointer indicium representing the cell storing the control word corresponding to the currently accessible sector; a control word supply means for retrieving said pointer indicium from said storage means and for storing control words in said string, said control word supply means being responsive to said pointer indicium for storing a first type of control word in any cell of said string storing a second type of control word corresponding to a sector which is to be accessed following access to currently accessible sector; means for successively retrieving said control words from said storage means in synchronism with the time of accessibility of said sectors provided by said access means and for transferring said retrieved control words to said control means, a control word being supplied to said control means as each sector is provided access by said access means.

12. A storage control system comprising: a circulating storage member having N circumferentially disposed sectors for storing information, where N is an integer; controllable access means coupled to said storage member for providing sequential access to all of said sectors during each cycle of circulation of said member, said access means being controllable to perform selectively the storage operations of entering information into and retrieving information from said sectors as access is provided thereby; a storage means comprising a string of addressable storage cells for storing control words and a set of addressable storage cells adapted to store data words, the number of cells in said string being equal to M times N where M is an integer, access being provided to the content of said string during each M cycles of circulation of said storage member, each of the cells of said string of cells storing one of a string of control words, each of a plurality of said control words being a first type of control word representing one of said storage operations and each of the remaining control words of said string of control words being a second type of control word representing an ineffective operation, each of said control words corresponding to a respective one of said sectors and including a pointer address representing the cell storing the control word corresponding to the next accessible sector; control means for receiving a control word and for responding to a control word representing a storage operation for controlling said access means to execute the storage operation represented by said control word, responsive to a control word representing an ineffective operation to control execution of an ineffective operation during access to said respective one of said sectors and being responsive to the pointer address in each control word to store a pointer indicium in one of said set of storage cells of said storage means, said pointer indicium representing the cell storing the control word corresponding to the currently accessible sector; a control word supply means for retrieving said pointer indicium from said storage means and for storing control words in said string, said control word supply means being responsive to said pointer indicium for storing a first type of control word in any cell of said string storing a second type of control word corresponding to a sector which is to be accessed following access to the currently accessible sector; means for successively retrieving said control words from said storage means in synchronism with the time of accessibility of said sectors provided by said access means and for transferring said retrieved control words to said control means, a control word being supplied to said control means as each sector is provided access by said access means.

13. A storage control system comprising: a circulating storage member having N circumferentially disposed sectors for storing information, where N is an integer; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a string of addressable contiguously disposed storage cells and a set of addressable storage cells adapted for storing data words, the number of cells in said string being M times N where M is an integer representing a number of cycles of circulation of said storage member, each of said cells in said string storing a control word, each of a plurality of said control words being a first type of control word representing one of said storage operations and each of the remaining control words being a second type of control word representing an ineffective storage operation, each of said control words corresponding to a respective one of said sectors and including a pointer address representing the cell in said string containing the control word corresponding to the next accessible sector; control means for receiving a control word and for responding to a control word representing a storage operation for controlling said access means to execute the storage operation represented by said control word, responsive to a control word representing an ineffective storage operation for controlling an ineffective storage operation during access to said respective one of said sectors and being responsive to the pointer address in each control word to store a pointer indicium in one of said set of storage cells of said storage means, said pointer indicium representing the cell storing the control word corresponding to the currently accessible sector; a control word supply means for retrieving said pointer indicium from said storage means and for storing control words in the cells of said string, said control word supply means being responsive to said pointer indicium to store a first type of control word in a cell storing a second type of control word corresponding to a sector which is to be accessed following access to the currently accessible sector at a cell being P times N cells relative to the cell storing the control word corresponding to the currently accessible sector where P is an integer; means for successively retrieving said control words from said storage means in synchronism with the time of accessibility of said sectors provided by said access means and for transferring said retrieved control words to said control means, a control word being supplied to said control means as each sector is provided access by said access means.

14. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a string of addressable storage cells and a set of addressable storage cells adapted to store data words, the number of cells in said string being equal to the number of said sectors for which said access is provided during a cycle of circulation of said storage member, each of said cells in said string storing a control word, each of a plurality of said control words being a first type of control word representing one of said storage operations and each of the remaining control words being a second type of control word representing an ineffective operation, each of said control words corresponding to a respective one of said sectors and each of said control words including a pointer address representing the cell of said string containing the control word corresponding to the next accessible sector; control means for receiving a control word and for responding to a control word representing a storage operation for controlling said access means to execute the operation represented by said control word, responsive to a control word representing an ineffective operation to execute an ineffective operation during access to a respective one of said sectors and being responsive to the pointer address in each control word to store a pointer indicium in one of said set of storage cells of said storage means, said pointer indicium representing the cell storing the control word corresponding to the currently accessible sector; retrieving means for successively retrieving said control words from said storage means in synchronism with the time of accessibility of said sectors provided by said access means and for transferring said retrieved control words to said control means, a control word being supplied to said control means as each sector is provided access by said access means; a control word supply means for retrieving said pointer indicium from said storage means and for storing control words in the cells of said string, said control word supply means being responsive to said pointer indicium to store said second type of control word in the cell of said string containing the respective one control word corresponding to the currently accessible sector following the time of execution of said one control word.

15. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a string of addressable cells, the number of cells in said string being equal to the number of said sectors for which said access is provided during a cycle of circulation of said storage member, each of the cells of said string storing a control word corresponding to a respective one of said sectors, each of the cells of said string initially storing a first type of control word representing an ineffective storage operation; control means for receiving a control word and for responding to a control word for controlling said access means to execute the storage operation represented by said control word during access to a respective one of said sectors; a control word supply means for storing a second type control word representing one of said storage operations in a plurality of the cells of said string, said supply means retrieving and transferring a first one of said control words to said control means at the completion of storing said second type of control words; means for successively retrieving said control words from said storage means following the completion of execution of said first one of said control words, in synchronism with the time of accessibility of said sectors provided by said access means and for transferring said retrieved control words to said control means, a control word being supplied to said control means as each sector is provided access by said access means.

16. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a string of addressable cells and a set of addressable cells adapted to store information, the number of cells in said string being equal to the number of said sectors for which said access is provided during a cycle of circulation of said storage member, each of said cells of said string storing a control word corresponding to a respective one of said sectors, each of said cells of said string initially storing a first type of control word representing an ineffective storage operation, each of said control words including a pointer address representing the cell in said string storing the control word corresponding to the next accessible sector; control means for receiving a control word and for responding to the control word for controlling said access means to execute the storage operation represented by the control word during access to a respective one of said sectors and being responsive to said pointer address to store a pointer indicium before the execution of each control word, said pointer indicium representing the cell storing the control word corresponding to the currently accessible sector; a control word supply means for storing a second type of control word representing one of said storage operations in a plurality of cells of said string, said supply means retrieving and transferring a first one of said control words to said control means at the completion of storing said second type of control words, and said supply means retrieving said pointer indicium and being responsive to said pointer indicium for storing a second type of control word in any cell of said string storing a first type of control word corresponding to a sector, which is to be accessed following access to the currently accessible sector; means for successively retrieving said control words from said storage means following the completion of execution of said first one of said control words, in synchronism with the time of accessibility of said sectors provided by said access means and for transferring said retrieved control words to said control means, a control word being supplied to said control means as each sector is provided access by said access means.

17. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising first and second sets of storage cells, the number of cells in said first set being equal to the number of said sectors for which said access is provided during a cycle of circulation of said storage member, each of said cells of said second set being adapted to store information, each of said cells of said first set storing a control word, each of a plurality of said control words representing one of said storage operations, said storage means being controllable to execute selectively the storage operations of entering information into and retrieving information from cells of said first set; control means for receiving a control word and for responding to a control word representing a storage operation for controlling said access means and said storage means to execute the storage operation represented by said control word; means for successively retrieving said control words from said storage means in synchronism with the time of accessibility of said sectors provided by said access means and for transferring said retrieved control words to said control means, a control word being supplied to said control means as each sector is provided access by said access means.

18. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words including a function code representing one of a plurality of different types of transfer operations; control means responsive to said function code representing a transfer operation for controlling said access means to perform a storage operation for effecting the transfer operation represented by said function code and being further responsive to said function code for transmitting a control signal; information supply and utilization means for supplying said information entered into and utilizing said information retrieved from said sectors as access is provided; information transfer means coupled to said control means to receive said control signal and coupled to said supply and utilization means and said access means, said transfer means being responsive to said control signal for transferring information between said supply and utilization means and said access means for implementing said storage operations of entering information into and retrieving information from said sectors; means for successively retrieving said control words from said storage means in synchronism with the time of accessibility of said sectors provided by said access means and for transferring said retrieved control words to said control means, a control word being supplied to said control means as each sector is provided access by said access means.

19. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectivity the storage operations of entering information into and retrieving information from said sectors as access is provided thereby; a storage means comprising a first set of storage cells, the number of cells in said first set being equal to the number of said sectors for which access is provided during a cycle of circulation of said storage member, each of said cells in said first set storing a control word, each of a plurality of said control words including a function code representing one of a plurality of different types of transfer operations, and a plurality of storage cells, each of said plurality of storage cells being adapted to store data words supplied to and received from said access means for implementing said storage operations of entering information into and retrieving information from said sectors as access is provided thereto; control means for receiving a control word, for responding to said function code representing a transfer operation for controlling said access means to execute a storage operation for effecting the transfer operation represented by said function code, and for responding to said function code for transmitting a control signal; information transfer means coupled to said control means to receive said control signal and coupled to said storage means and said access means, said transfer means being responsive to said control signal for transferring said information between said storage means and said access means for implementing said storage operations of entering information into and retrieving information from said sectors; means for successively retrieving said control words from said storage means in synchronism with the time of accessibility of said sectors provided by said access means and for transferring said retrieved control words to said control means, a control word being supplied to said control means as each sector is provided access by said access means.

20. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words including a function code representing one of a plurality of different types of transfer operations, each of said cells corresponding to a respective one of said sectors; control means for receiving a control word, for responding to a function code representing a transfer operation for controlling said access means to execute said retrieving operation for retrieving and transmitting information as the sector corresponding to the cell containing the control word being executed is accessed and for responding to said function code for transmitting a control signal; information utilization means for receiving information; transfer means coupled to said control means for receiving said control signal and coupled to said access means and said utilization means, said transfer means being responsive to said control signal for receiving information from said access means and transmitting information to said utilization means; means for selectively retrieving said control words from said storage means in synchronism with the time of accessibility of said sectors provided by said access means and for transferring said retrieved control words to said control means, a control word being supplied to said control means as each sector is provided access by said access means.

21. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells storing a control word, each of a plurality of said control words including a function code representing one of a plurality of different types of transfer operations, each of said cells corresponding to a respective one of said sectors; control means for receiving a control word, for responding to said function code representing said transfer operation for controlling said access means to execute said storing operation for receiving and storing information as the sector corresponding to the cell containing the control word including said function code is being assessed and for responding to said function code for transmitting a control signal; information supply means for transmitting information; transfer means coupled to said control means for receiving said control signal and coupled to said access means and said supply means, said transfer means being responsive to said control signal for transmitting information to said access means and receiving information transmitted by said supply means; means for selectively retrieving said control words from said storage means in synchronism with the time of accessibility of said sectors provided by said access means and for transferring said retrieved control words to said control means, a control word being supplied to said control means as each sector is provided access by said access means.

22. A storage control system comprising: a circulating storage member having a plurality of circumferentially disposed sectors for storing information; controllabe access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of said sectors for which said access is provided during a cycle of circulation of said storage member, each of said cells of said set storing a control word, each of a plurality of said control words of said set including a function code representing one of a plurality of different types of transfer operations, each of the remaining control words of said set including a function code representing an ineffective operation and each of the control words of said set corresponding to a respective one of said sectors; control means for receiving a control word, for responding to said function code representing a transfer operation for controlling said access means to execute one of said storage operations for effecting the transfer operation represented by said function code as a corresponding sector is being accessed, being responsive to said function code representing an ineffective operation for controlling said access means to execute a storage operation as a corresponding sector is being accessed, and for responding to said function code for transmitting a control signal; information supply and utilization means for transmitting and receiving data words; transfer means coupled to said control means for receiving said control signal and coupled to said supply and utilization means and said access means, said transfer means being responsive to said control signal for transferring information between said supply and utilization means and said access means to effect the transfer operation represented by said function code; means for successively retrieving said control words from said storage means in synchronism with the time of accessibility of said sectors provided by said access means and for transferring said retrieved control words to said control means, a control word being supplied to said control means as each sector is provided access by said access means.

23. A storage control system comprising: a circulating storage member having N circumferentially disposed sectors for storing information, where N is an integer; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being M times N where M is an integer, access being provided to said set during each M cycles of circulation of said storage member, each of said cells of said set storing a control word, each of a plurality of said control words of said set including a function code representing one of a plurality of different types of transfer operations, each of the remaining control words of said set including a function code representing an ineffective operation and each of the control words of said set corresponding to a respective one of said sectors; control means for receiving a control word, for responding to said function code representing a transfer operation for controlling said access means to execute one of said storage operations for effecting the transfer operation represented by said function code as a corresponding sector is being accessed, being responsive to said function code representing an ineffective operation for controlling said access means to execute a storage operation as a corresponding sector is being accessed, and for responding to said function code for transmitting a control signal; information supply and utilization means for transmitting and receiving data words; transfer means coupled to said control means for receiving said control signal and coupled to said supply and utilization means and said access means, said transfer means being responsive to said control signal for transferring information between said supply and utilization means and said access means to effect the transfer operation represented by said function code; means for successively retrieving said control words from said storage means in synchronism with the time of accessibility of said sectors provided by said access means and for transferring said retrieved control words to said control means, a control word being supplied to said control means as each sector is provided access by said access means.

24. A storage control system comprising: a circulating storage member having a plurality of circumferentially disposed sectors for storing information; controllable access means coupled to said storage member for providing sequential access to all of said sectors during each cycle of circulation of said member, said access means being controllable to execute selectively the storage operations of entering information into and retrieving information from said sectors as access is provided thereby; a random access storage means comprising a set of addressable storage cells, the number of cells in said set being equal to the number of aid sectors for which said access is provided during a cycle of circulation of said storage member, each of said cells of said set storing a control word, each of a plurality of said control words including a function code representing one of a plurality of different storage operations, each of the remaining control words of said set including a function code representing an ineffective operation, each of said cells corresponding to a respective one of said sectors, and each of said control words including a pointer address, said pointer address representing the cell storing the control word corresponding to the next accessible sector; control means for receiving a control word, for responding to said function code representing said transfer operation for controlling said access means to execute one of said storage operations for effecting the transfer operation represented by said function code as the sector corresponding to the cell containing the control word is accessible and for responding to said pointer address for transmitting an address signal set representing the cell storing the control word corresponding to the next accessible sector; information supply and utilization means for transmitting and receiving information; transfer means coupled to said control means for receiving said control signal and coupled to said supply and utilization means and said access means, said transfer means being responsive to said control signal for transferring information between said supply and utilization means and said access means to effect the transfer operation represented by said function code; means coupled to said control means to receive said signal set and being responsive to each of said signal sets for selectively retrieving said control words from the cells represented by said signal sets in synchronism with the time of accessibility of said sectors provided by said access means and for transferring said retrieved control words to said control means, a control word being supplied to said control means as each sector is provided access by said access means.

25. A storage control system comprising: a circulating storage member having a plurality of circumferentially disposed sectors for storing information, one of said sectors representing a starting sector and one of said sectors representing an ending sector of each cycle of circulation; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being equal to the number of sectors for which said access is provided during a cycle of circulation of said storage member, each of said cells storing a control word, each of a plurality of said control words representing one of said storage operations and each of said cells storing a control word corresponding to a respective one of said sectors, each of said control words including a pointer address, said pointer address representing the cell storing the control word corresponding to the next accessible sector, the control word corresponding to said ending sector including a pointer address representing the cell storing the control word corresponding to said starting sector; control means for receiving a control word, for responding to a control word representing a storage operation for controlling said access means to execute the operation represented by said control word and for responding to said pointer address to transmit a signal set, said signal set representing the cell containing the control word corresponding to the next accessible sector; means coupled to said control means to receive said signal set and responsive to said signal set for successively retrieving said control words cyclically during successive cycles of circulation from said storage means in synchronism with the time of accessibility of said sectors provided by said access means and for transferring said retrieved control words to said control means, a control word being supplied to said control means as each sector is provided access by said access means.

26. A storage control system comprising: a circulating storage member having N circumferentially disposed sectors for storing information, where N is an integer, one of said sectors representing a starting sector and one of said sectors representing an ending sector of each cycle of circulation; controllable access means coupled to said storage member for providing sequential access to all of said sectors during each cycle of circulation of said member, said access means being controllable to execute selectively the storage operations of entering information into and retrieving information from said sectors as access is provided thereby; a storage means comprising a set of storage cells, the number of cells in said set being M times N where M is an integer, access being provided to said set during each M cycles of circulation of said storage member, each of said cells storing a control word, each of a plurality of said control words representing one of said storage operations and each of said cells storing a control word corresponding to a respective one of said sectors, each of said control words including a pointer address representing the cell storing the control word corresponding to the next accessible sector, the control word stored in the M times Nth cell corresponding to an ending sector and including a pointer address representing the cell storing a control word corresponding to a starting sector of a cycle of circulation; control means for receiving a control word, for responding to a control word representing a storage operation for controlling said access means to execute the operation for controlling said access means to execute the operation represented by said control word and for responding to said pointer address to transmit a signal set, said signal set representing the cell containing the control word corresponding to the next accessible sector; means coupled to said control means to receive said signal set and responsive to said signal set for successively retrieving said control words cyclically during successive cycles of circulation from said storage means in synchronism with the time of accessibility of said sectors provided by said access means and for transferring said retrieved control words to said control means, a control word being supplied to said control means as each sector is provided access by said access means.

27. A storage control system comprising: a circulating storage member having a plurality of circumferentially disposed sectors for storing information; controllable access means coupled to said storage member for providing sequential access to all of said sectors during each cycle of circulation of said member, one of said sectors being accessed as the starting sector of each cycle of circulation, said access means being controllable to execute selectively the storage operations of entering information into and retrieving information from said sectors as access is provided thereby; a storage means comprising a first and second set of addressable cells, the number of cells in each of said first and second set being equal to the number of said sectors for which said access is provided during a cycle of circulation of said storage member, each of said cells storing a control word, each of a plurality of said control words representing one of said storage operations and each of said control words corresponding to a respective one of said sectors and a control word in a cell of each of said sets including a pointer address representing the cell of the other one of said sets storing the control word corresponding to said starting sector; control means for receiving a control word, for responding to a control word representing a storage operation for controlling said access means to execute the operation represented by said control word and for responding to said pointer address to transmit a signal set, said signal set representing the address of a cell in the other one of said sets storing the control word corresponding to a starting sector; means coupled to said control means to receive said control signal set and responsive to said signal set to alternate between said first and second sets of addressable cells for successively retrieving said control words from a different one of said sets of cells during each successive cycle of circulation of said storage member in synchronism with the time of accessibility of said sectors provided by said access means and transferring said retrieved control words to said control means, a control word being supplied to said control means as each sector is provided access by said access means.

28. A storage control system comprising: a circulating storage member having a plurality of circumferentially disposed sectors for storing information; controllable access means coupled to said storage member for providing sequential acess to all of said sectors during each cycle of circulation of said member, one of said sectors being accessed as the starting sector of each cycle of circulation, said access means being controllable to execute selectively the storage operations of entering information into and retrieving information from said sectors as access is provided thereby; a storage means comprising a first and second set of addressable cells for storing control words and a third set of cells for storing information, the number of cells in each of said first and second sets being equal to the number of said sectors for which said access is provided during a cycle of circulation of said storage member, each of said cells storing a control word, each of a plurality of said control words representing one of said storage operations and each of said control words corresponding to a respective one of said sectors, the remaining cells of each of said first and second sets storing control words representing an ineffective operation, and a control word in a cell of each of said first and second sets including a pointer address representing the cell of the other one of said sets storing the control word corresponding to said starting sector; control means for receiving a control word, for responding to a control word representing a storage operation for controlling said access means to execute the operation represented by said control word and for responding to said pointer address for transmitting an address signal set representative of the cell storing the control word corresponding to the next accessible sector and for storing pointer indicia in a cell of said third set representing the cell of the other one of said sets storing the control word corresponding to said starting sector; retrieving means coupled to said control means to receive said address signal set and responsive to said address signal set to alternate between said first and second sets as the sector representing said starting sector is accessed for successively retrieving said control words from a different one of said sets during each successive cycle of circulation of said storage member for supplying control words in synchronism with the time of accessibility of said sectors provided by said access means and transferring said retrieved control words to said control means, a control word being supplied to said control means as each sector is provided access by said access means; means for retrieving said pointer indicia from said storage means and being responsive to said pointer indicia for storing a control word representing said ineffective operation in the cell of said first set containing a respective one control word corresponding to the currently accessible sector following the time of execution of said one control word when said retrieving means is retrieving control words from said first set and being further responsive to said pointer indicia for performing a storage operation for storing a plurality of control words representing storage operations in a plurality of cells of said second set when said retrieving means is retrieving control words from said first set.

29. A storage control system comprising: a circulating storage member having a plurality of circumferentially disposed sectors for storing information; controllable access means coupled to said storage member for providing sequential access to all of said sectors during each cycle of circulation of said member, one of said sectors being accessed as the starting sector of each cycle of circulation, said access means being controllable to execute selectively the storage operations of entering data words into and retrieving data words from said sectors as access is provided thereby; a storage means comprising a first and second set of addressable storage cells for storing control words and a third set of cells being adapted for storing data words, the number of cells in each of said first and second sets being equal to the number of said sectors for which said access is provided during a cycle of circulation of said storage member, each of said cells storing a control word, each of a plurality of said control words representing one of said storage operations and each of said control words corresponding to a respective one of said sectors, the remaining cells of each of said first and second sets storing control words representing an ineffective operation, and a control word in a cell of said first and second sets including a pointer address representing the cell of the other one of said first and second sets storing the control word corresponding to said starting sector; control means for receiving a control word, for responding to a control word for controlling said access means to execute the storage operation represented by said control word, and for responding to said pointer address for transmitting a signal set, said signal set being representative of the cell storing the control word corresponding to the next accessible sector, and for storing a pointer indicium in a cell of said third set representing the cell of the other one of said first and second sets storing the control word corresponding to the currently accessible sector; retrieving means coupled to said control means to receive said signal set and being responsive to said signal set to alternate between said first and second sets of addressable cells for successively retrieving said control words from a different one of said first and second sets during each successive cycle of circulation of said storage member for supplying control words in synchronism with the time of accessibility of said sectors provided by said access means and transferring said retrieved control words to said control means, a control word being supplied to said control means as each sector is provided access by said access means; means for retrieving said pointer indicium from said storage means and being responsive to said pointer indicium for storing a control word representing said ineffective operation in the cell containing the control word of the set currently supplying control words and corresponding to the currently accessible sector following the time of completion of execution of the control word corresponding to the currently accessible sector and being further responsive to said pointer indicium for testing the contents of any cell of the other one of said sets to determine the presence of a control word representing said ineffective operation and for storing a plurality of control words representing storage operations in a plurality of cells storing control words representing said ineffective operation in the other one of said sets.

30. A storage control system comprising: a circulating storage member having a plurality of circumferentially disposed sectors; controllable access means coupled to said storage member for providing sequential access to all of said sectors during each cycle of circulation of said member, one of said sectors being the starting sector accessed each cycle of circulation, said access means being controllable to execute selectively the storage operations of entering data wards into and retrieving data words from said sectors as access is provided thereby; a storage means comprising a string of contiguously disposed storage cells and a set of cells being adapted to store data words, the number of cells in said string being equal to the number of said sectors for which said access is provided during a cycle of circulation of said storage member, each of said cells of said string storing a control word, each of a plurality of said control words representing one of a plurality of transfer operations, each of a plurality of said control words representing an ineffective operation, each of said control words including a pointer address representing the cell in said string storing a control word corresponding to the next accessible sector, said storage means being controllable to perform selectively the storage operations of entering information into and retrieving information from cells of said set; control means for receiving a control word, for responding to a control word representing a transfer operation for controlling said access means and said storage means to execute the storage operation for effecting the transfer operation represented by said control word and for transmitting a control signal, said control signal representing a transfer operation, for responding to a control word representing an ineffective operation for controlling said access means to perform a storage operation during the time of access to a corresponding sector, and for responding to said pointer address for storing a pointer indicium in one of the cells of said set, said pointer indicium being representative of the cell in said string storing a control word corresponding to the currently accessible sector, and being further responsive to said pointer address to transmit a signal set, said signal set being representative of the cell in said string storing a control word corresponding to the next accessible sector; transfer means coupled to said access means and said storage means for receiving and transmitting data words and coupled to said control means to receive said control signal and being responsive to said control signal to execute the transfer of data words between said access means and said storage means for effecting said transfer operation represented by said control word; control word supply means being coupled to said storage means for retrieving said pointer indicium and being responsive to said pointer indicium for storing a control word representing an ineffective operation in the cell of said string storing the control word corresponding to the currently accessible sector following the time of completion of execution of the control word corresponding to the currently accessible sector, for retrieveing and testing any control word of said string of cells in a cell storing a control word corresponding to a sector which is to be accessed following access to the currently accessible sector to determine the presence of a control word representing an ineffective operation and being responsive following said testing for storing a control word representing a transfer operation in any cell containing a control word representing said ineffective operation; means coupled to said control means to receive said signal set and being responsive to the signal set representing the cell storing the control word corresponding to said starting sector for repeatedly retrieving the control word content of the cells of said string during successive cycles of circulation from said storage means in synchronism with the time of accessibility of said sectors provided by said access means and for transferring said retrieved control words to said control means, a control word being supplied to said control means as each sector is provided access by said access means.

References Cited

UNITED STATES PATENTS

| | | |
|---|---|---|
| 3,274,554 | 9/1966 | Hopper et al. |
| 3,302,182 | 1/1967 | Lynch et al. |
| 3,323,110 | 5/1967 | Oliari et al. |
| 3,337,854 | 8/1967 | Cray et al. |
| 3,362,015 | 1/1968 | Mackie et al. |

PAUL J. HENON, Primary Examiner

H. E. SPRINGBORN, Assistant Examiner